(12) United States Patent
Wagner et al.

(10) Patent No.: US 10,491,462 B1
(45) Date of Patent: Nov. 26, 2019

(54) PORT VERIFICATION FOR CUSTOMER INTERCONNECTION IN A DATA CENTER

(71) Applicant: Equinix, Inc., Redwood City, CA (US)

(72) Inventors: Theodore James Wagner, Arvada, CO (US); Brooke Mouland, Centennial, CO (US)

(73) Assignee: Equinix, Inc., Redwood City, CA (US)

( * ) Notice: Subject to any disclaimer, the term of this patent is extended or adjusted under 35 U.S.C. 154(b) by 181 days.

(21) Appl. No.: 15/396,261

(22) Filed: Dec. 30, 2016

Related U.S. Application Data

(60) Provisional application No. 62/332,583, filed on May 6, 2016.

(51) Int. Cl.
  *G06F 15/173* (2006.01)
  *H04L 12/24* (2006.01)
  *H04L 29/08* (2006.01)

(52) U.S. Cl.
  CPC .......... *H04L 41/0803* (2013.01); *H04L 67/10* (2013.01)

(58) Field of Classification Search
  CPC ............................ H04L 41/0803; H04L 67/10
  See application file for complete search history.

(56) References Cited

U.S. PATENT DOCUMENTS

| | | | |
|---|---|---|---|
| 8,537,845 B2 | 9/2013 | Waldrop et al. | |
| 2005/0220143 A1* | 10/2005 | DelRegno | H04L 47/10 370/471 |
| 2016/0127454 A1 | 5/2016 | Maheshwari et al. | |
| 2016/0308762 A1 | 10/2016 | Teng et al. | |
| 2016/0337473 A1 | 11/2016 | Rao | |
| 2016/0344590 A1 | 11/2016 | Huey et al. | |
| 2017/0078771 A1 | 3/2017 | Lingampalli | |

OTHER PUBLICATIONS

U.S. Appl. No. 62/319,627, by Kirk Allan Felbinger, filed Apr. 7, 2016.
U.S. Appl. No. 15/414,697, by Kirk Allan Felbinger, filed Jan. 25, 2017.

\* cited by examiner

*Primary Examiner* — Hua Fan
(74) *Attorney, Agent, or Firm* — Shumaker & Sieffert, P.A.

(57) ABSTRACT

In general, techniques are described for dynamic port configuration with an interconnection system (IS) to streamline a process for port ordering and reduce port configuration and interconnection services provisioning times. In one example, an IS includes at least one interconnection facility and a programmable network platform, the at least one interconnection facility including: a network switch fabric having at least one network device and a plurality of ports; and a customer cage for a customer of an IS provider, wherein the programmable network platform is configured to, in response to a port verification request initiated by the customer to verify a port of the plurality of ports that is cross-connected to a customer network in the customer cage to provide connectivity with the network switch fabric: obtain an indication of port configuration for the port; and output the indication of port configuration for the port for display to the customer.

11 Claims, 12 Drawing Sheets

PORT VERIFICATION FOR CUSTOMER INTERCONNECTION IN A DATA CENTER

This application claims the benefit of U.S. Provisional Patent Application No. 62/332,583, filed May 6, 2016, which is incorporated by reference herein in its entirety.

TECHNICAL FIELD

The invention relates to computer networks and, more specifically, to a computer network for interconnecting customers co-located in a data center.

BACKGROUND

A network services exchange provider or co-location provider (a "provider") may employ a communication facility, such as a data center, in which multiple customers of the provider locate network, server, and storage gear and interconnect to a variety of telecommunications and other network service provider(s) with a minimum of cost and complexity. Such customers are said to be "co-located" in the communication facility. A communication facility may be shared by the multiple tenants locating networking equipment within the communication facility. With IT and communications facilities in safe, secure hands, telecommunications, Internet, application service providers, cloud service providers, content providers, and other providers, as well as enterprises, enjoy less latency and the freedom to focus on their core business. Additionally, customers may reduce their traffic back-haul costs and free up their internal networks for other uses.

In some cases, the communication facility includes an interconnection system that provides interconnection services by which customers of the provider may interconnect to one another over the interconnection system infrastructure or by which a customer of the provider may interconnect its spatially and/or geographically distributed customer networking equipment over the communication facility infrastructure. The communication facility may in such cases be referred to as an "interconnection facility" or "co-location and interconnection facility." An interconnection facility provider may provide services accessible to co-located customers via an interconnection, such services including, for example, a cloud exchange, Internet access, an Internet exchange, "metro connect" for reaching other communication facilities within a metropolitan area, a cross-connect from one customer to another, and other interconnection services. Interconnections may represent connections between customer networks for inter-customer interconnections (between different customers) or intra-customer interconnections (between areas of an interconnection center(s) that are operated/leased by a single customer).

Cloud computing refers to the use of dynamically scalable computing resources accessible via a network, such as the Internet. The computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS), Platform-as-a-Service (PaaS), Infrastructure-as-a-Service (IaaS), Virtualization-as-a-Service (VaaS), and data storage-as-a-service (dSaaS).

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers. An interconnection facility may interconnect cloud customers and cloud service providers using a cloud exchange, for example.

SUMMARY

In general, techniques are described for dynamic port configuration with an interconnection system to streamline a process for port ordering and reduce port configuration and interconnection services provisioning times. In some examples, the interconnection system includes a programmable network platform and an interconnection facility. The programmable network platform for the interconnection facility in some examples provides a port ordering interface by which customers of the interconnection system provider ("provider") may order a port of the interconnection facility (e.g., a port of a network interface card of a network switch) to be dedicated by the provider for exchanging packets with a customer network of the customer that is co-located in the interconnection facility. A port provides a physical interface to the interconnection facility switch fabric, for instance, and underlies interconnection services for a customer network that is cross-connected to the port. The interconnection facility switch fabric is deployed and managed by the interconnection system provider to facilitate interconnection and service delivery among customer networks for customers of the provider.

The port ordering interface may be accessible via a customer portal deployed by the provider. Using the port ordering interface for ordering the port, the customer may specify one or more parameters for the requested port, such as a port model, size/bandwidth, or location, for example. Upon receiving a submitted port order, the programmable network platform may automatically determine an appropriate available port within the interconnection facility for the customer and creates a cross-connect task. A technician may then provision a physical cross-connect between the port and the customer co-location space according to the cross-connect task. Upon provisioning the physical cross-connect, the technician may then mark the cross-connect task as completed in a computing system in communication with the programmable network platform, which triggers the programmable network platform to configure the port according to the submitted port order and to provision services for the port according to interconnection products requested by the customer to be provided via the port in the submitted port order.

Once the programmable network platform determines from the interconnection facility network that the port has been successfully configured and, in some cases, provisioned to deliver the requested services, the programmable network platform notifies the customer that the port is ready for acceptance and use. In this way, the interconnection system may streamline port ordering and reduce port configuration and interconnection services provisioning times. For instance, the techniques may allow customers to directly order ports rather than working with salespeople and sales engineers to configure orders for entry into interconnection facility provider systems. Further, because manual port orders may have a high rate of data errors, which slow down order entry and processing, portal-based or API-based port ordering as described herein can improve customer data capture and speed port delivery while improving customer experience.

In another aspect of this disclosure, techniques are described for verifying, by a customer using the programmable network platform, configuration and provisioning of a purchased port of the interconnection facility. For example, a customer may verify a port of a network switch fabric that is cross-connected to a customer network in the customer cage to provide connectivity between the customer network and the interconnection facility network.

In some examples, the verification techniques may include mirroring the purchased port to cause traffic received at the port to be mirrored to a mirror port of the interconnection. The programmable network platform may receive mirrored traffic from the mirror port and output an indication of the mirror traffic to a simulation interface by which the customer of the interconnection system provider may determine whether the port is correctly provisioned. For example, using the simulation interface, the customer may determine from the indication of the mirrored traffic whether the customer is able to transmit/receive Ethernet frames, whether the port has visibility to a configured VLAN for a cross-connection with the customer network, whether the port is able to see customer MAC addresses, indications of configured bandwidth or port performance (e.g., dropped packets), and other indications of port configuration and provisioning.

In some examples, the verification techniques may include simulating, by the programmable network platform, customer operations to a customer of the interconnection system provider that has purchased a port of the interconnection facility. For example, the programmable network platform may include a simulation application that may exchange, via a customer-purchased port, data communications with a customer network that is connected to the port in a manner that simulates, to the customer network, typical communications of remote customer network co-located in the interconnection facility. In some cases, the simulation application simulates the operations of buyers (cloud customers, e.g., enterprises) or sellers (e.g., cloud services providers or resellers) of cloud services via a purchased port. In this way, the simulation application may impersonate ports or services that are programmed to behave like customers (e.g., cloud service buyers or cloud service sellers) interconnected to a customer that has requested simulated customer communications.

In some instances, the simulated customer operations may include simulating behavior of a remote customer network router to the customer network via the purchased port. The simulated remote customer network router may peer with the customer network router for a routing protocol to receive and advertise routes for the private layer 3 network that includes the customer network and the simulated remote customer network router. In this way, the customer may verify that establishing an interconnection to an actual remote customer network does not cause routing loops in the customer network.

The port verification techniques may provide one or more advantages. For example, the port verification techniques may allow a customer to perform self-service port testing. In other words, a customer may purchase a port and test, by operation of the simulation application, the customer's port and traffic capabilities within the interconnection system (e.g., the cloud exchange) to confirm appropriate configuration and functionality. This may streamline service provisioning and reduce a need for manual testing requiring participation of interconnection system provider technicians. The port verification techniques may be combined with portal-based port ordering to create a more fully self-service startup operation for customers of the interconnection facility provider.

In some examples, an interconnection system comprises at least one interconnection facility and a programmable network platform, the at least one interconnection facility including: a network switch fabric having at least one network device and a plurality of ports; and a customer cage for a customer of an interconnection system provider for the interconnection system, wherein the programmable network platform is configured to, in response to a port verification request initiated by the customer to verify a port of the plurality of ports that is cross-connected to a customer network in the customer cage to provide connectivity with the network switch fabric: obtain an indication of port configuration for the port; and output the indication of port configuration for the port for display to the customer.

In some examples, an interconnection system comprises at least one interconnection facility and a programmable network platform, the at least one interconnection facility including: a network switch fabric having at least one network device and a plurality of ports; a customer cage for a customer of an interconnection system provider for the interconnection system, wherein the programmable network platform is configured to, in response to a port verification request initiated by the customer to verify a port of the plurality of ports that is cross-connected to a customer network in the customer cage to provide connectivity with the network switch fabric: simulate a remote customer network reachable by the customer network via the port.

In some examples, a computing device comprises at least one programmable processor operably coupled to a memory; and a programmable network platform for at least one interconnection facility having a network switch fabric having at least one network device, a plurality of ports, and a customer cage for a customer of an interconnection system provider for the at least one interconnection facility, wherein programmable network platform is configured for execution by the at least one programmable processor to: in response to a port verification request initiated by the customer to verify a port of the plurality of ports that is cross-connected to a customer network in the customer cage to provide connectivity with the network switch fabric, obtain an indication of port configuration for the port and output the indication of port configuration for the port for display to the customer.

In some examples, a computing device comprises at least one programmable processor operably coupled to a memory; and a programmable network platform for at least one interconnection facility having a network switch fabric having at least one network device, a plurality of ports, and a customer cage for a customer of an interconnection system provider for the at least one interconnection facility, wherein programmable network platform is configured for execution by the at least one programmable processor to: in response to a port verification request initiated by the customer to verify a port of the plurality of ports that is cross-connected to a customer network in the customer cage to provide connectivity with the network switch fabric, simulate a remote customer network reachable by the customer network via the port.

In some examples, a method comprises receiving, by a programmable network platform for at least one interconnection facility having a network switch fabric having at least one network device and a plurality of ports and a customer cage for a customer of an interconnection system provider for the at least one interconnection facility, a port request for a customer co-located in an interconnection facility; and by the programmable network platform in response to a port verification request initiated by the customer to verify a port of the plurality of ports that is cross-connected to a customer network in the customer cage to provide connectivity with the network switch fabric, obtaining an indication of port configuration for the port and outputting the indication of port configuration for the port for display to the customer.

In some examples, a method comprises receiving, by a programmable network platform for at least one interconnection facility having a network switch fabric having at least one network device and a plurality of ports and a customer cage for a customer of an interconnection system provider for the at least one interconnection facility, a port request for a customer co-located in an interconnection facility; and by the programmable network platform in response to a port verification request initiated by the customer to verify a port of the plurality of ports that is cross-connected to a customer network in the customer cage to provide connectivity with the network switch fabric, simulating a remote customer network reachable by the customer network via the port.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
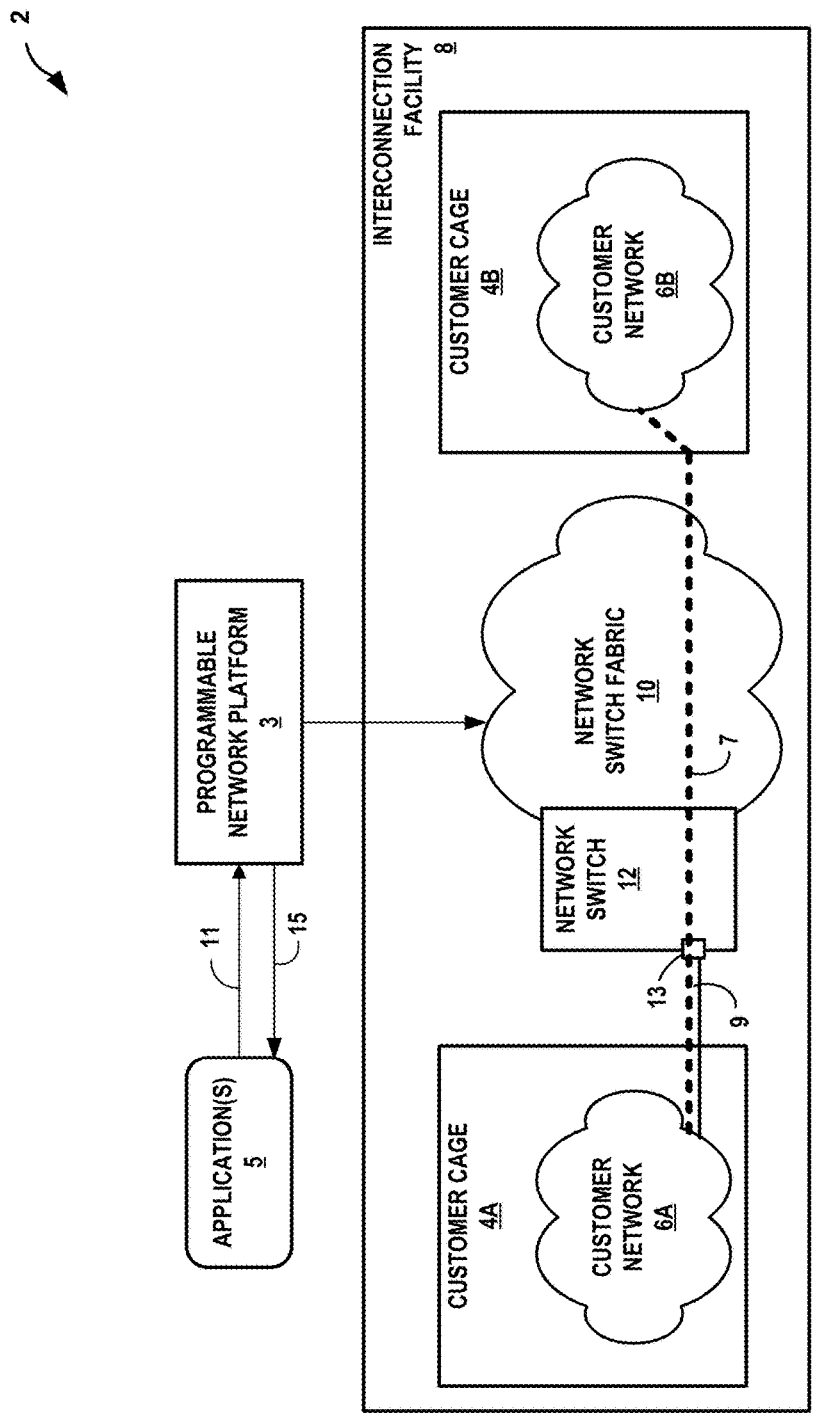
FIG. 1 is a block diagram that illustrates a high-level view of an interconnection system having a programmable network platform that offers port ordering and automated port configuration and services provisioning to a customer of an interconnection facility in accordance with techniques described herein.

FIG. 1 is a block diagram that illustrates a high-level view of an interconnection system 2 having a programmable network platform 3 that offers portal-based port ordering and automated port configuration and services provisioning to a customer of an interconnection facility in accordance with techniques described herein. Interconnection system 2 depicts an interconnection facility 8 operated by an interconnection system provider, the interconnection facility 8 having an network switch fabric 10 configurable for interconnecting customer networks 6A-6B (collectively, "customer networks 6") located within multiple customer cages 4A-4B (collectively, "customer cages 4"). In some instances, each of customer cages 4 may be associated with a different customer of the interconnection system provider. In some instances, customer cages 4 are both associated with a single customer of the interconnection system provider.

As used herein, the term "customer" of the interconnection system provider may refer to a tenant of the interconnection facility 8 deployed by the interconnection system provider, whereby the customer leases space within the interconnection facility 8. The customer may do so in order to co-locate with other tenants for improved efficiencies over independent facilities as well as to interconnect network equipment with the other tenants' network equipment within the interconnection facility or campus for reduced latency/jitter and improved reliability, performance, and security versus transport networks, among other reasons. The interconnection system provider may in some cases be referred to as an interconnection facility provider in that these will typically be the same entity. Customer networks 6 may each include customer network equipment and form an L2, L3, or L2/L3 network. Customers of the interconnection system provider may include enterprises, network service providers, managed service providers, resellers, cloud service providers, and wholesalers, for instance.

In the interconnection facility 8, space may be partitioned and leased to customers in flexible increments in the form of cages (an area of a common floor space enclosed by a fence or other demarcation), cabinets, racks, suites (an enclosed room that is not part of a common floor space), or other space in which customers may situate their network equipment to provide and/or receive network services to/from other customer(s) co-located in the interconnection facility 8 or, e.g., another interconnection facility managed by the interconnection facility provider. Although illustrated and primarily described with respect to customer cages 4 in interconnection facility 8, the techniques of this disclosure are similarly applicable for provisioning network switch fabric 10 ports for customer equipment distributed within an interconnection facility 8 (or distributed interconnection facilities) in various space factors, such as those identified above.

Each of cages 4 are installed by the interconnection system 2 provider and provide a secure structure and location for a customer to store and access their customer network, while also having access to optical network infrastructure 10, e.g., via a customer side of a patch panel (not shown) situated within the cage 4 mesh that defines a cage boundary or "demarcation" within the interconnection facility, in that the customer alone has access to the cage interior. Such patch panels (more simply and hereinafter, "panels") may also provide the interconnection system 2 provider with convenient and secure access to a provider side of the panels. For example, the provider may be able to access the provider-sides of panels for cages 4 without accessing the interior of cages 4. Likewise, the customers leasing or otherwise having access to the interiors of cages 4 may be able to access the customer sides of panels but may be prevented from accessing the provider sides of panels. In some examples, the provider may able to access a secure hallway between cages 4, which may allow access to the provider side of the panels.

Network switch fabric 10 represents network switching infrastructure including, e.g., layer 3 (L3) and layer 2 (L2) forwarding elements, which may include one or more routers, switches, and other L3/L2 forwarding devices. Interconnection facility 8 may include one or more real servers that offer one or more compute/computing farms that offer services to customers associated with cages 2, 4 and/or apply services to service traffic via network switch fabric 10. Network switch fabric 10 may be configured to provide interconnection services to customer network 6A for a customer, e.g., a carrier/NSP, co-location customer, cloud service provider, or cloud service customer, via port 13 of network switch 12. More specifically, port 13 of network switch 12 may be configured to allow direct exchange of network traffic between the customer network 6A co-located in customer cage 6A and the network switch fabric upon the provisioning of cross-connect 9, in order to enable interconnection services provided by the interconnection facility 8. Network switch 12 may represent an L2, L3, or L2/L3 switch, router, or other network devices. Network switch fabric 10 may include many hundreds or thousands of ports for many tens or hundreds of switches and routers deployed by the interconnection facility 8 provider and networked to provide network switch fabric 10.

In some examples, network switch fabric 10 may include optical and photonic switching infrastructure. Additional information regarding examples of network switch fabric is found in U.S. patent application Ser. No. 14/868,177, filed Sep. 28, 2015 and entitled "Active Panel Demarcation;" and in U.S. patent application Ser. No. 14/937,787, filed Nov. 10, 2015 "Automated Fiber Cross-connect Service within a Multi-tenant Interconnection Facility;" each of which are incorporated by reference in their respective entireties.

Interconnection system 2 further includes a programmable network platform (PNP) 3, alternatively referred to herein as an "interconnection platform." Programmable network platform 3 may expose a software interface that defines the methods, fields, and/or other software primitives by which application(s) 5 may invoke PNP 3 to submit port orders and receive indications of port order completion. In this way, PNP 3 may allow customers, carriers, network service providers (NSPs), and/or the interconnection system provider itself with the programmatic capability of requesting a port for a customer via a portal or other application.

Programmable network platform 3 may represent an application executing within one or more data centers of system 2 or alternatively, off-site/remotely at a back office or branch of the interconnection system 2 provider, for instance. Although shown as administering a single interconnection facility 8, programmable network platform 3 may control service provisioning for multiple different interconnection facilities. Alternatively or additionally, multiple separate instances of the programmable network platform 3 may control service provisioning for respective multiple different interconnection facilities.

Application(s) 5 represents at least one application that communicates with PNP 3 to request a port for a customer. Application(s) 5 represent client-side software for interfacing with PNP 3 and may include a customer portal, customer applications, an interconnection system 2 provider application that is accessible only to interconnection facility 8 operators, a console such as a command-line interface or graphical user interface. Users or clients of application(s) 5 may include enterprise customers, cloud service and content providers, carriers, network service providers (NSPs), and/or the interconnection system provider itself, for instance. In some cases, application 5 and PNP 3 may represent different functions or modules of the same application.

A user, such as a customer, enters port order data for a port order via an interface of an application of application(s) 5. Upon submission of the port order, the application of application(s) 5 issues, to PNP 3, a port order 11 that specifies parameters for a port of network switch fabric 10. Port order 11 may specify, for instance, a bandwidth or data rate and protocol, a start date at which the port should be operational, an end date at which the port should be torn down (potentially indefinite until the contract term expires), port identifiers for panel ports at demarcation panels of customer cage 4A, an identifier or location for interconnection facility 8 (e.g., metropolitan area and data center name), port form factor/model (e.g., RJ45, optical form-factor), physical layer standard/protocol (e.g., GigE, SONET/SDH), and other port configuration parameters. Port 13, e.g., may represent a port of a network interface card, a dense port concentrator (DPC) or other a line card, or other port by which a cross-connect 9 may be connected to exchange packets with network switch fabric 10.

In response to receiving port order 11, PNP 3 determines an appropriate, available port of network switch fabric 10 to satisfy port order 11. In the illustrated example, PNP 3 determines that port 13 of network switch 12 is not in use or reserved and is thus available to satisfy port order 11. PNP 3 may further determine that, among the available ports of network switch fabric 10, port 13 is a shortest distance to the customer cage 4A panel or is otherwise the most optimally located for cross-connect 9 provisioning, and PNP 3 may select port 13 on this basis for port order 11. PNP 3 may further determine that port 13 meets or exceeds that requested parameters (e.g., bandwidth) indicated in port order 11. To determine the appropriate, available port, PNP 3 may query a database of interconnection assets that stores records indicating a status and parameters of the ports of network switch fabric 10. If no port is available to satisfy port order 11, PNP 3 may reply to port order 11 with an order rejected message or a suggestion for an available port with different parameters, for example.

In response to identifying an appropriate, available port, PNP 3 may reserve the port and in some case may generate a cross-connect task. Based on the cross-connect task, a technician may then provision a physical cross-connect 9 between the port 13 and customer cage 4A. Cross-connect 9 represents a physical cable (such as a CAT5/6, coax, or optical fiber cable).

Upon provisioning the physical cross-connect 9, the technician may then mark the cross-connect task as completed via an operator interface output by PNP 3. In response to determining the cross-connect task is complete, PNP 3 automatically configures the port 13 according to the port order 11 and to provision services for the port according to interconnection products requested by the customer to be provided via the port in the port order 11. In some examples, PNP 3 further determines that port 13 is active ("lit") before configuring the port. In some examples, PNP further determines that both port 13 is active/lit and that the remote port of customer cage 4A or customer network 6A coupled to cross-connect 9 is active/lit before configuring the port.

To configure port 13, PNP 3 may configure, via SNMP or a software-defined networking (SDN) protocol, switch 12 to enable port 13 and to configure the port with the requested parameters of port order 13 (e.g. bandwidth). PNP 3 configures elements of network switch fabric 10, including switch 12, by issuing configuration commands either directly to such elements by way of configuration interfaces of the elements, or indirectly to such elements via software-defined networking (SDN) controllers that manage the elements on behalf of the PNP 3. PNP 3 may in some instances be alternatively referred to as an orchestrator in that PNP 3 orchestrates SDN controllers so as to configure switches and/or other elements of network switch fabric 10.

Cross-connect 9 may represent a Layer 0 ("L0") connection in that the physical cross-connect underlies the Open Systems Interconnection (OSI) model or TCP/IP model for packet networking. In particular, cross-connect 9 may underlie an optical transport network (OTN) layer that (typically in conjunction with a SONET/SDH layer) provides Layer 1 ("L1") connectivity between optical networking devices such as wavelength division multiplexing (WDM) devices or may underlie an Ethernet layer that provides L1 connectivity.

Cross-connect 9 may in some cases underlie a layer 2 ("L2") or layer 3 ("L3") service provided by the interconnection system 2 provider to interconnect customer cages 4A, 4B according to an L2 or L3 service. For example, interconnection facility 8 may operate a network services exchange, such as Ethernet Exchange, and Internet Exchange, and/or a Cloud Exchange, and each of these may make use of interconnection 7 to transmit L2/L3 packet data between customer networks 6A, 6B. As other examples, interconnection facility 8 may provide Internet access to customer network 6A via a co-located network service provider and/or metro-based connectivity to other interconnection facilities managed by the provider. Interconnection facility 8 may provide both any combination of the above described products and services, in various examples.

Further example details of a facility that provides a cloud-based services exchange are found in U.S. patent application Ser. No. 15/099,407, filed Apr. 14, 2016 and entitled "Cloud-Based Services Exchange;" and in U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 15/001,766, filed Jan. 20, 2016 and entitled "Multi-cloud, Multi-service Data Model." Further example details of a facility that provides a carrier Ethernet exchange are found in U.S. Pat. No. 8,537,845 entitled "REAL TIME CONFIGURATION AND PROVISIONING FOR A CARRIER ETHERNET EXCHANGE," filed Sep. 13, 2012. Each of the above patents and patent applications are incorporated herein by reference in their respective entireties.

PNP 3 may further provision port 13 to deliver interconnection services. For example, port 13 may be configured with sub-interfaces (e.g., Virtual LANs) for corresponding private connections ("virtual circuits") that may be implemented using L2VPNs or IP-VPNs configured in network switch fabric 10. In this way, PNP 3 may automatically provision port 13 for service delivery in response to determining that the port is available (i.e., cross-connect 9 is attached).

PNP 3 may receive an indication from network switch 12 that port 13 is successfully configured. Once the PNP 3 determines that port 13 has been successfully configured and is ready to deliver the requested services, PNP 3 notifies the customer that port 13 is ready for acceptance and use by sending a port order success response message 15. The customer may thereafter configure customer network 6A to begin exchanging packets with port 13. In this way, the interconnection system 2 may streamline port ordering and reduce port configuration and interconnection services provisioning times.

Figure 2A:
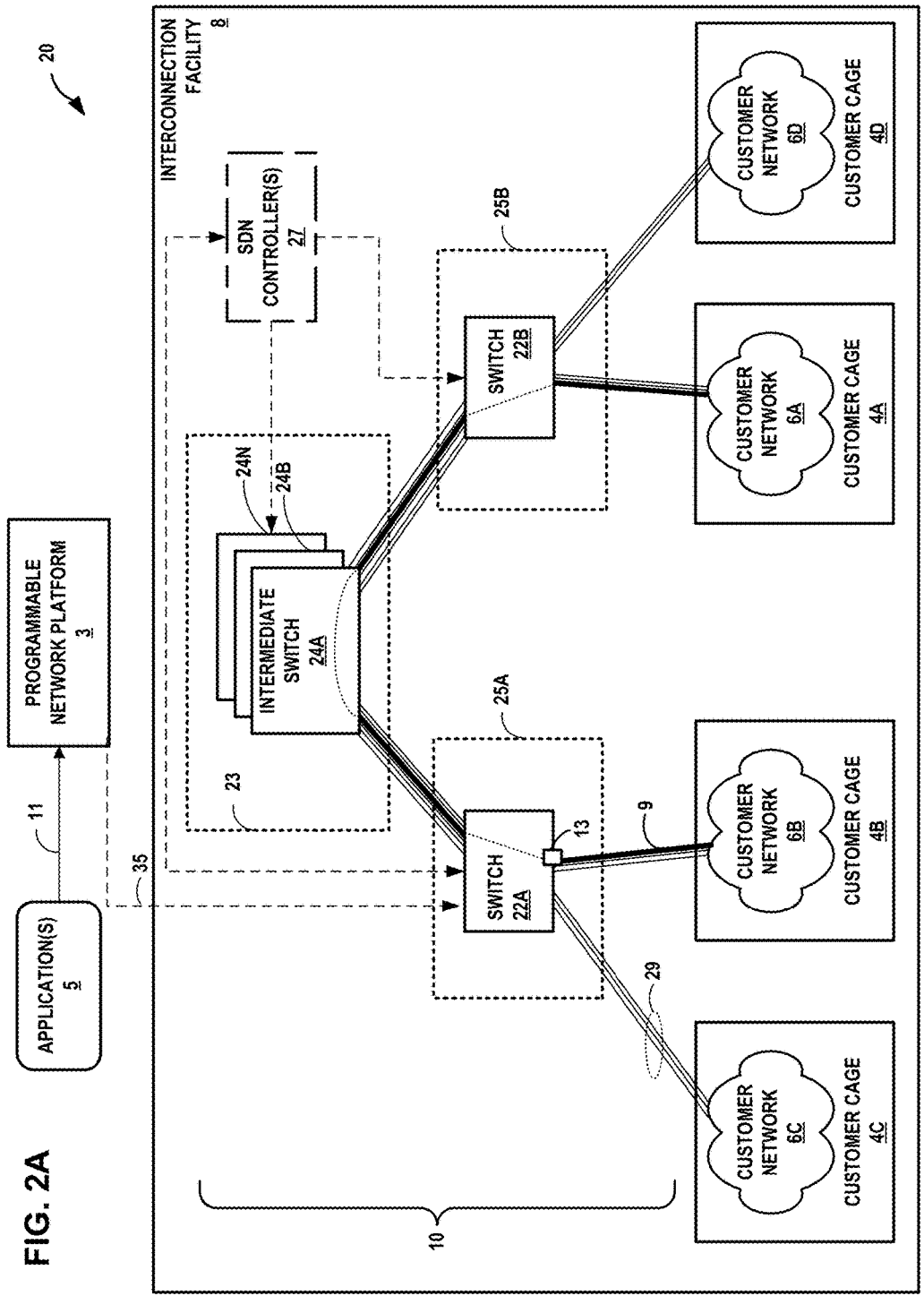
FIGS. 2A-2B are block diagrams that illustrate, in further detail, an interconnection system having a programmable network platform that offers portal-based port ordering in accordance with techniques described herein.
Figure 2B:
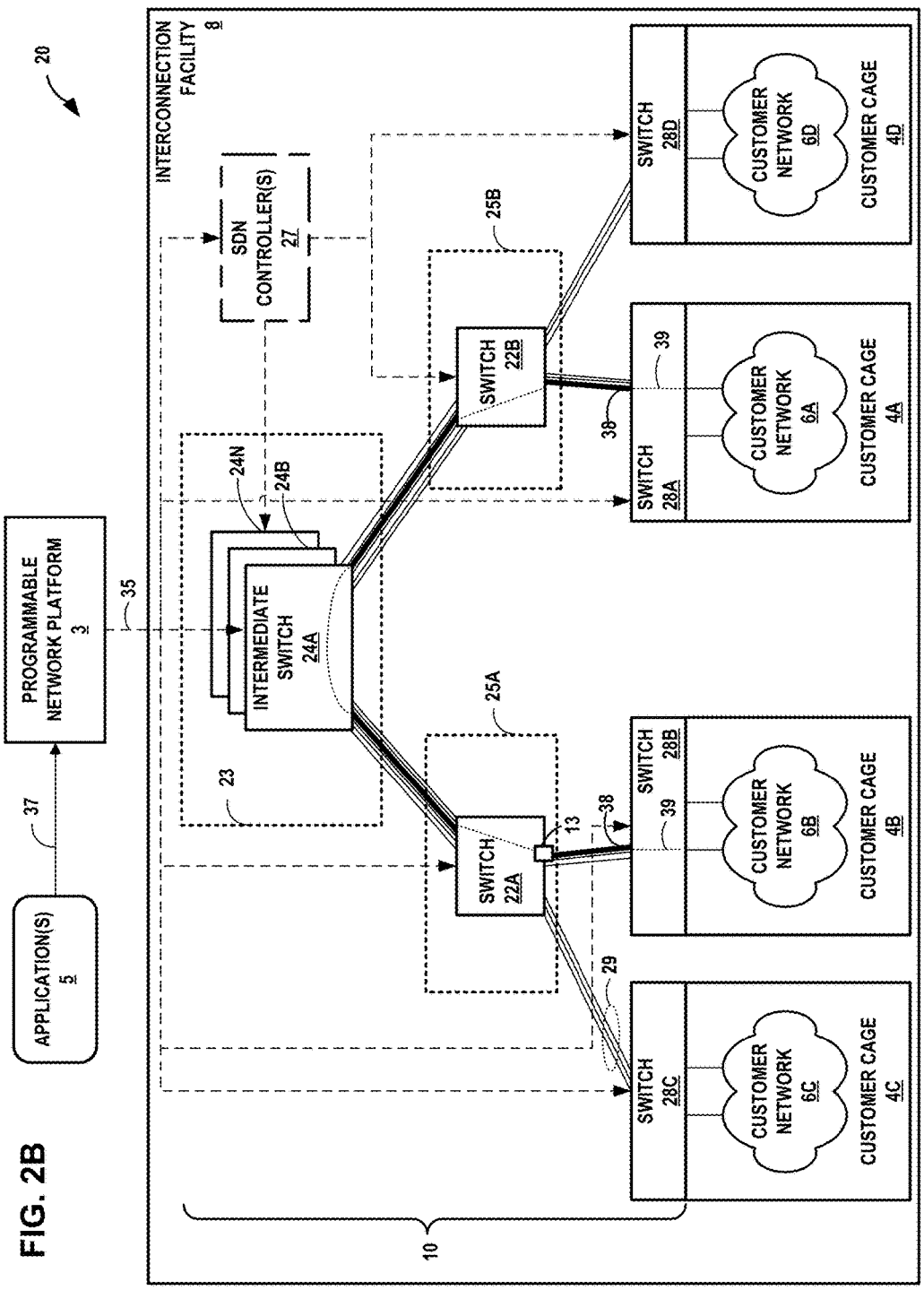

FIGS. 2A-2B are block diagrams that illustrate, in further detail, an interconnection system having a programmable network platform that offers portal-based port ordering in accordance with techniques described herein. Interconnection system 20 of FIGS. 2A-2B depicts an interconnection facility 8 operated by an interconnection system provider and may represent an example of interconnection facility 8 of FIG. 1. In this example, the network switch fabric 10 of interconnection facility 8 includes multiple distribution facilities (or "distribution frames") 23 and 25A-25B each having one or more switches 24A-24N (collectively, "switches 24") and switches 22A-22B (collectively, "switches 22") arranged, e.g., hierarchically or as a flat mesh and configured to switch packets or optical signals so as to implement interconnections provisioned in interconnection facility 8 by PNP 3. Switches 24, 22 may include large port-count switches. Main distribution facility 23 and intermediate distribution facilities 25 may be located within infrastructure cages accessible within interconnection facility 8 only to the facility provider.

Other examples of interconnection facility 8 may include more or fewer components to those illustrated and described herein. For example, interconnection facility 8 may include additional customer cages 4, intermediate distribution frames 25, switches 22 and 24, and so forth.

To configure port 13 in switch 22A, programmable network platform 3 may issue configuration commands 35 to a configuration interface for the switch. Programmable network platform 3 may further facilitate L2/L3 services, such as L2VPNs, L3 VPNs, that use cross-connect 9 to transport packetized data exchanged between customer cages 4A, 4B, for instance.

In some examples, interconnection facility 8 or an off-site environment includes one or more software-defined networking (SDN) controller(s) 27 to configure switches 22, 24. SDN controllers 27 may present a uniform interface for switch configuration to PNP 3 while configuring switches 22, 24 using vendor-specific protocols or methods in instances of interconnection facility having switches 22, 24 manufactured by multiple different vendors, each such vendor further manufacturing one of the SDN controller(s) 27 to manage the switches associated with the vendor. Programmable network platform 3 orchestrates SDN controller(s) 27 to configure switches 22, 24 with ports and sub-interfaces to establish interconnections. Alternatively, the interconnection provider's own SDN controller and PNP together with the provider's network back office infrastructure can directly interface with the switches using south bound interfaces and/or commands.

In the example of FIG. 2B, customer cages 4 include respective active demarcation panels that may include respective switches 28 configurable by PNP 3 (directly or via SDN controller(s) 27).

FIGS. 2A-2B illustrate example control configurations in which some switches 22, 24, and 28 are configured by SDN controller(s) and some are configured by PNP 3. Other control configurations may exist in various implementations. In some examples, PNP 3 may indirectly configure switch fabric 10 entirely via SDN controller(s) 27. In other examples, PNP 3 may directly configure switch fabric 10.

Figure 3:
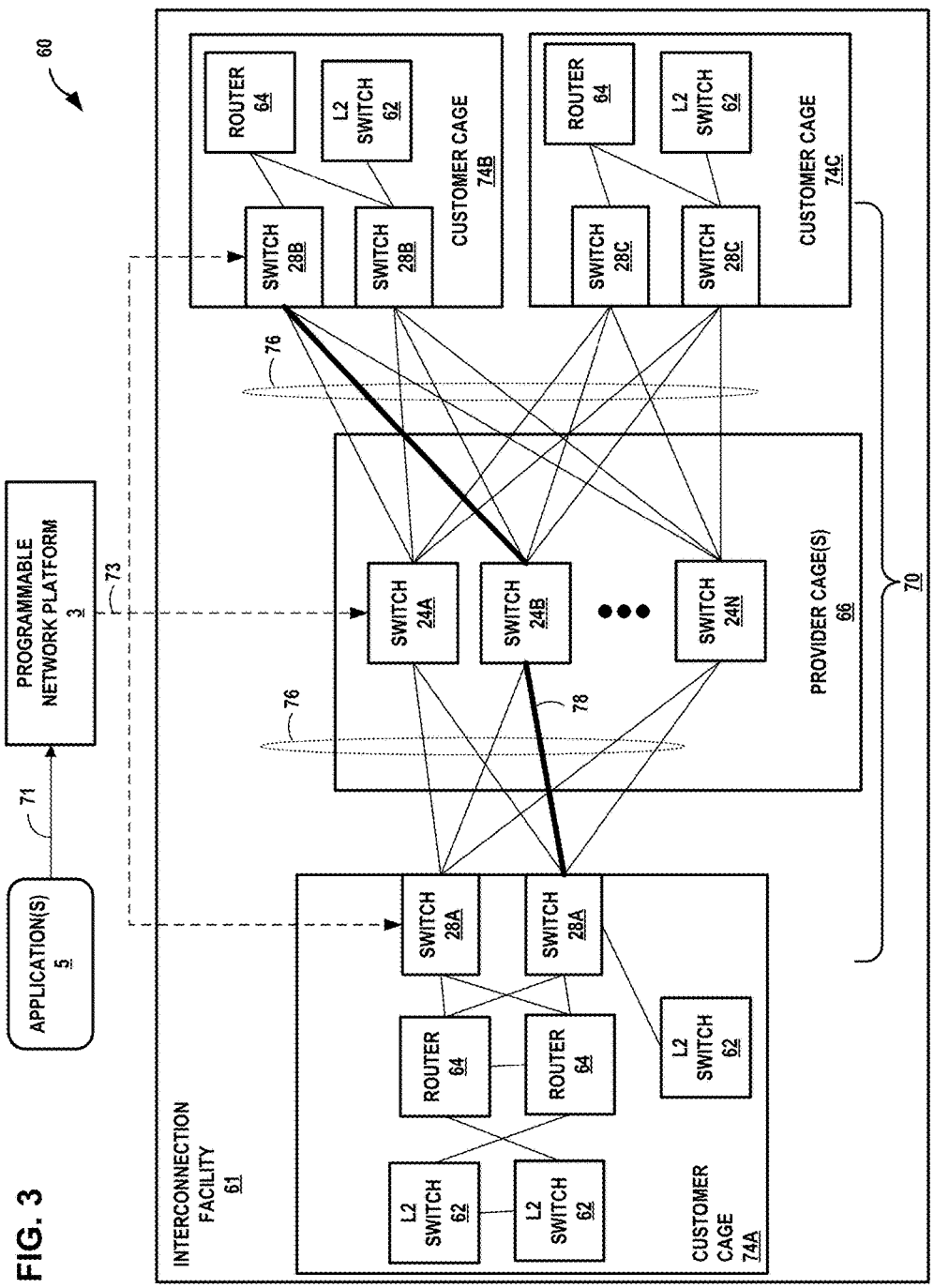
FIG. 3 is a block diagram that illustrates an example interconnection system having a programmable network platform that offers port ordering in accordance with techniques described herein.

FIG. 3 is a block diagram that illustrates an example interconnection system having a programmable network platform that offers port ordering in accordance with techniques described herein. Interconnection facility 60 may represent an example instance of any of interconnection facilities 8 of FIGS. 1, 2A, and 2B, for instance.

Interconnection facility 61 includes a distributed data center switch architecture in which switches of switch fabric 70 distributed throughout one or more data centers may switch signals between customer cages.

Customer cages 74 may represent example instances of customer cages 6, each having customer networks illustrated in further detail. For example, customer cage 74A includes a customer network having routers 64 (alternatively, L3 switches) and L2 switches 62 arranged to connect to switches 28A located in a demarcation or other area of customer cage 74A to receive and transmit signals via access links. Cross-connects 76 may represent fiber bundles, such as MPO fiber bundles, that couple ports of switches 28 with intermediate switches 24 of provider cages 66. PNP 3 issues configuration commands 73 to configure ports of switches 28, 24 according to techniques described herein.

Interconnection facility 61 may include multiple data centers in a metropolitan area connected by, e.g., dark fiber not fully utilized or using transport links and configured by PNP 3 to transport signals between switches 24 of different data centers.

Figure 4:
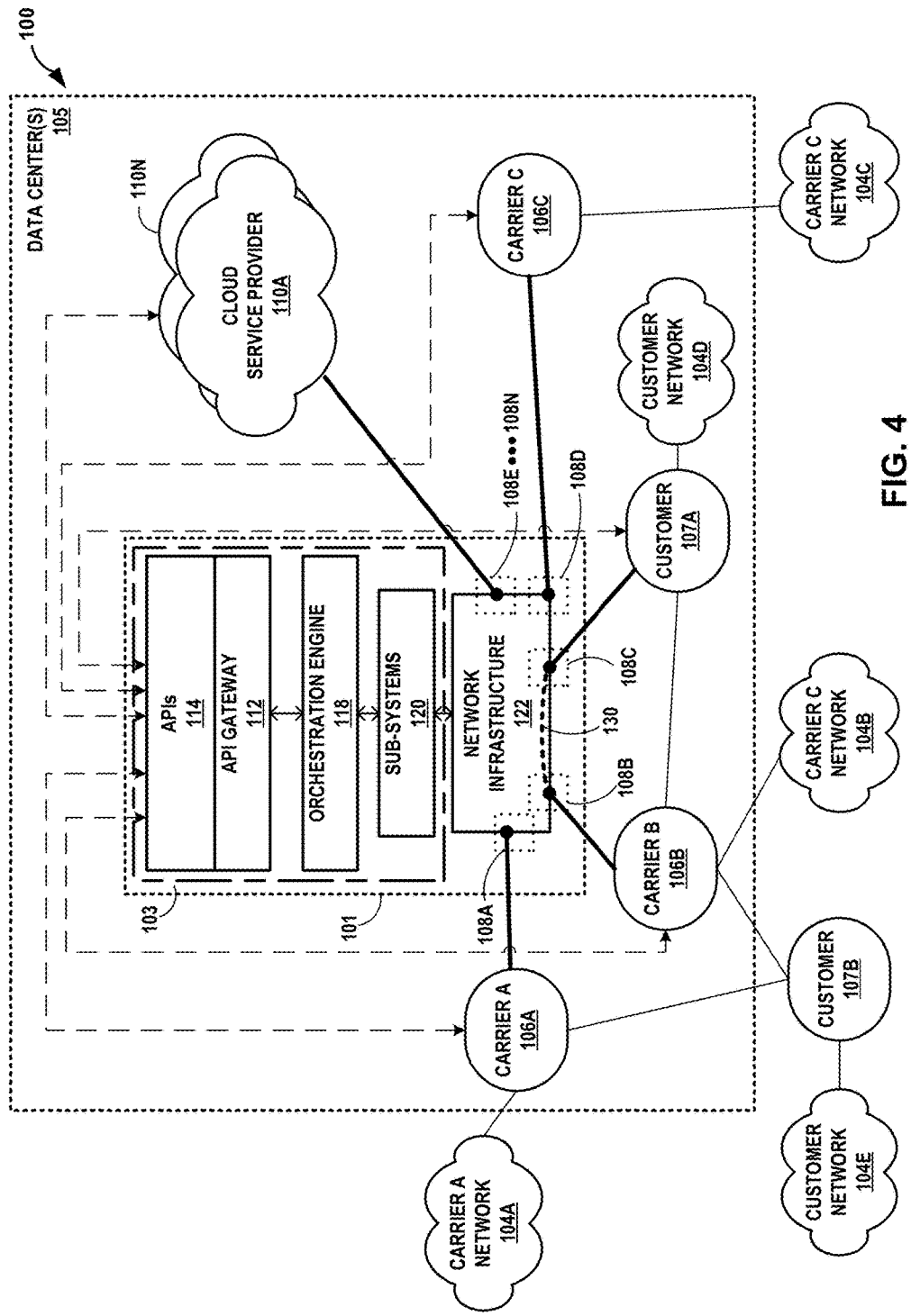
FIG. 4 is a block diagram illustrating an interconnection system in which one or more data centers provide an operating environment for an interconnection facility, in accordance with techniques described herein.

FIG. 4 is a block diagram illustrating an interconnection system 100 in which one or more data centers 105 ("data center(s) 105") provide an operating environment for an interconnection facility 101, in accordance with techniques described herein. In the example of FIG. 4, interconnection system 100 includes interconnection facility 101 and programmable network platform 103, which may represent example instances of interconnection facility 8, 61 and PNP 3, respectively.

According to techniques described in this disclosure, interconnection S100 allows a corresponding one of customer networks 104D, 104E and carrier networks 104A-104C (collectively, "private networks 104") of any carriers 106A-106C (collectively, "carriers 106") or other customers of the interconnection system provider (including customers 107A, 107B) to request that PNP 103 provision a port for any of networks 104.

Carriers 106 may each represent a network service provider that is associated with a transit network by which network subscribers of the carrier 106 may access cloud services offered by CSPs 110 via the communication facility 100. In general, customers of CSPs 110 may include network carriers, large enterprises, managed service providers (MSPS), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the communication facility 100.

Patch panels 108A-108N (collectively "panels 108") may each represent a demarcation point between a carrier 106, customer 107A, 107B, and CSP 110 and the interconnection system provider. Interconnection facility 101 includes network infrastructure 122 that provides a L2/L3 network switching fabric by which CSPs 110 and customers/carriers interconnect. This enables a carrier/customer to create interconnections to multiple CSPs 110 via a connection to a fiber patch panel 108, and this further enables the provisioning of the interconnections by the interconnection system provider using PNP 3. In other words, instead of having to establish separate connections across transit networks to access different cloud service providers or different cloud services of one or more cloud service providers, interconnection facility 101 allows customers to interconnect to multiple CSPs 110 and cloud services using network infrastructure 122 within data center(s) 105.

In some examples, APIs 114 facilitate machine-to-machine communication to enable dynamic and on-demand provisioning of ports and virtual circuits in the metro-wide infrastructure for interconnecting customer and cloud service provider or other provider networks. In this way, programmable network platform 103 enables the automation of aspects of service. For example, the software interfaces may provide an automated and seamless way for customers to establish, de-install and manage ports of panels 108 and interconnection with multiple, different cloud service providers 110 co-located in data center(s) 105.

In some examples, PNP 103 includes an API gateway 112 having one or more processors that executes one or more applications that expose software interfaces defined according to APIs 114. The applications may invoke services that correspond to endpoints of the APIs 114, and the services may themselves invoke the programmable network platform service of orchestration engine 118. API gateway 112 may execute on a management device such as one or virtual machines and/or real servers of data center(s) 105. Although shown as a single element in FIG. 4, API gateway 112 may comprise a cluster of one or more physical and/or virtual computing machines executing on one or more physical processors.

In some examples, PNP 103 includes an orchestration engine 118 that organizes, directs and integrates underlying software sub-systems 120 for managing various aspects of interconnection within the network infrastructure 122 including provisioning of ports and the switch fabric to establish cross-connects and, in some cases, managing cloud services. The orchestration engine 118 may, for example, provide a rule-driven workflow engine that operates between the APIs 114 and the underlying programmable network platform 103 that includes sub-systems 120 and network infrastructure 122. In this way, the orchestration engine 118 can be used by customer-proprietary applications and the APIs 114 for direct participation with programmable network platform 103. In other words, the orchestration engine 118 offers a "programmable network platform service" having various application engines to handle the API gateway 112 service requests.

Sub-systems 120 may offer port provisioning for invocation by orchestration engine 118. Sub-systems 120 and orchestration engine 118 may each be centralized or distributed applications and may execute on a management device such as one or virtual machines and/or real servers of data center(s) 105.

Network infrastructure 122 represents the network switching fabric of data center(s) 105 connected to the provider-side ports of panels 108. A customer may, using an application, request a port for a cross connect to a customer network. In response, PNP 103 configures the port according to techniques described in this disclosure.

Figure 5:
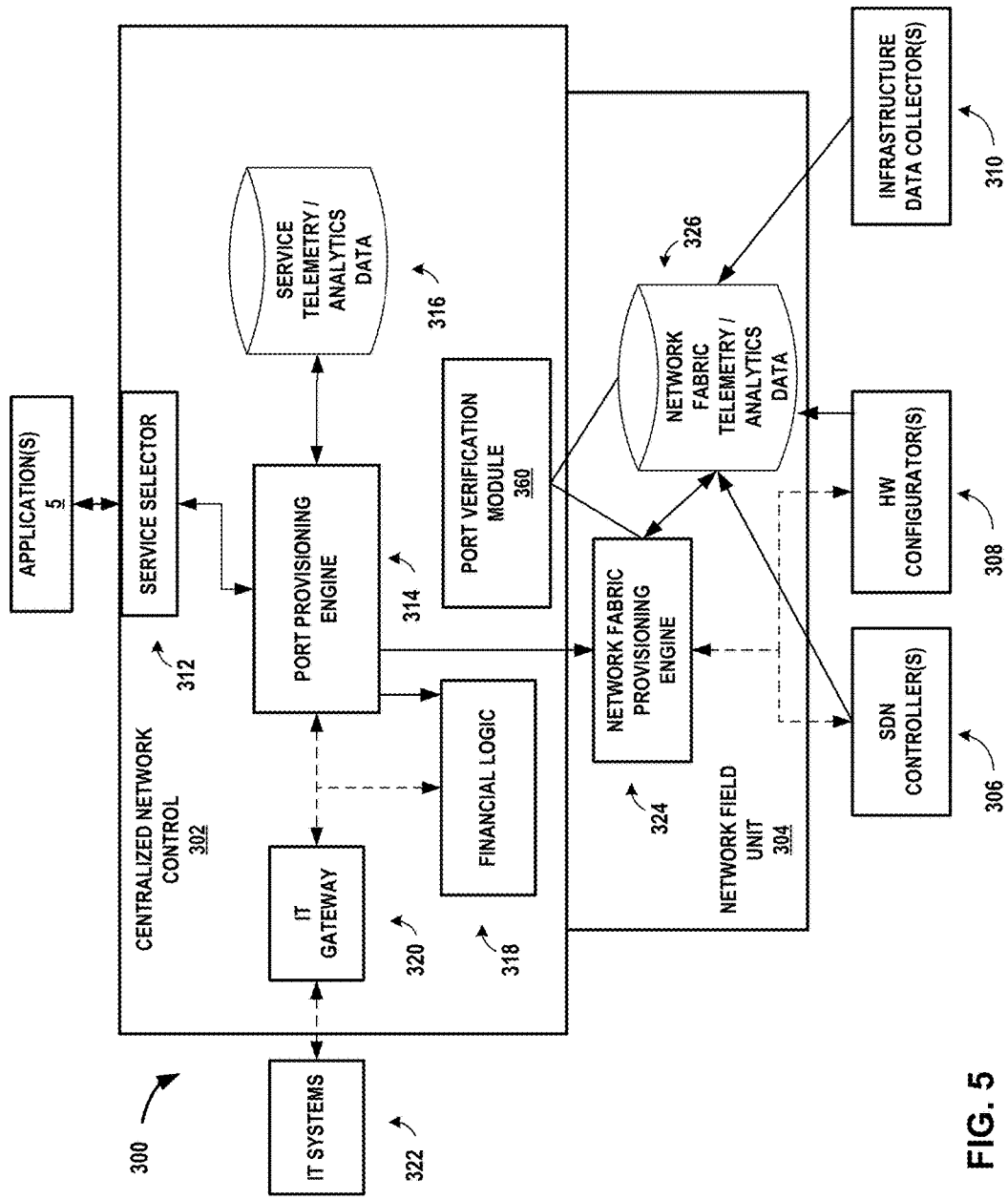
FIG. 5 is a block diagram illustrating an example architecture for a programmable network platform according to techniques described in this disclosure.

FIG. 5 is a block diagram illustrating an example architecture for a programmable network platform configured to receive a request for a port and dynamically provision the port within an interconnection facility, according to techniques described in this disclosure. FIG. 5 illustrates a programmable network platform 300 that includes multiple components, which collectively provide for dynamic configuration and management of metro-based interconnection facilities, in particular for the dynamic provisioning of ports. Programmable network platform 300 includes centralized network control (CNC) system 302 and one or more network field units (NFUs) 304 configured to interface with one or more software-defined networking (SDN) controllers 306, one or more hardware configurator(s) 308, one or more infrastructure data collector(s) 310, and information technology systems 322. Programmable network platform 300 may represent an example instance of programmable network platform 3 or another programmable network platform, controller, or system described herein for automatically configuring and provisioning ports.

Programmable network platform 300 may provide for the orchestration of port provisioning. In the example of FIG. 5, CNC system 302 enables the automation of aspects of port provisioning. As such, CNC system 302 may provide one or more software interfaces that allow customers to request a port and for services to be provisioned for the port in an interconnection facility, in an automated and seamless manner. CNC system 302 may include logic to receive a business service request for a port via an API call and convert that into the necessary business instantiation parameters and network provisioning parameters to be delivered and assured as a business service for the port. CNC system 302 may be the central intelligent processing unit of the orchestration system (e.g., programmable network platform 300) and there may be one logical instance of this intelligent logic present per instantiation.

In some examples, NFU 304 is implemented as a self-contained unit that receives requests or instructions from CNC system 302 to configure network infrastructure of a particular interconnection facility for one or more services. For instance, NFU 304 may comprise a combination of hardware and software. In some examples, NFU 304 may be a virtual machine. In any case, NFU 304 receives requests or instructions CNC system 302 based on customer requests submitted to CNC system 302. As further described below, NFU 304 may determine whether sufficient resources exist to provide the services requested by CNC system 302. If sufficient resources exist, NFU 304 may communicate or otherwise interoperate with SDN controllers 306, hardware configurators 308, and infrastructure data collectors 310 to configure the network infrastructure to provide the requested service. NFU 304 may represent a globally distributed intelligent logical unit that receives network instantiation commands from CNC system 302 and instantiates and configures the network resource that is needed to deliver the service. NFU 304 may have the intelligence to deliver and assure network services as per the request of CNC system 302.

In some examples, multiple interconnection facilities may be geographically dispersed. Each geographically positioned interconnection facility may have a corresponding NFU that is geographically positioned at the same location as the respective cloud exchange point. The corresponding NFU may configure and otherwise manage the network infrastructure of the particular geographically positioned interconnection facility. In this way, a particular NFU may receive requests or instructions from CNC system 302 and configure the network infrastructure of the interconnection facility that is managed by the particular NFU. In some cases, multiple interconnection facilities of a metropolitan area make up a metro-based interconnection facility managed by a single NFU.

NFU 304 may therefore represent the distributed processing unit of programmable network platform 300, which provides programmable network platform 300 with the ability to horizontal scale and deliver and assure services. NFU 304 is the component of programmable network platform 300 that may provide the functionality of configuring a requested port and provisioning the services on the port in a vendor agnostic and form factor agnostic manner. As shown in FIG. 5, NFU 304 has several software components that enable the distributed processing unit to provision the services.

In order to configure a port for a customer co-located in interconnection facilities managed by PNP 300, CNC system 302 includes a service selector 312. In some examples, service selector 312 may operate as an API gateway. For example, service selector 312 may expose software interfaces defined according to one or more APIs. Requests and/or instructions received by service selector 312 may be include the form of create, read, update, and/or delete (CRUD) requests made with respect to ports of interconnection facilities. Applications may invoke endpoints of the APIs provided by service selector 312, which may in turn invoke port provisioning engine 314. Service selector 312 may execute on one or virtual machines and/or real servers, for instance. Although shown as a single element in FIG. 5, service selector 312 may comprise a cluster of one or more physical and/or virtual computing machines executing on one or more physical processors. In some aspects, service selector 312 provides a service catalog that describes available services and providers for the available services.

Port provisioning engine 314 may receive requests to configure a port and provision services from service selector 312. Port provisioning engine 314, in conjunction with network field unit 304, organizes, directs and integrates underlying hardware and software sub-systems for managing various aspects of service provisioning within the network infrastructure as well as, in some cases, cloud services management. For instance, port provisioning engine 314 may provide a rule-driven workflow engine that operates between service selector 312 and the underlying network switch fabric for at least one interconnection facility that is configured by network field unit 304. In this way, port provisioning engine 314 can be invoked via service selector 312 by customer-proprietary applications or an interconnection system provider-based customer portal, for direct participation with the programmable network platform 300 of a co-location network infrastructure that is configurable by network field unit 304. As further described below, NFU 304 may receive instructions and/or requests from CNC system 302, which NFU 304 uses to configure ports and provision services for the ports.

Port provisioning engine 314 may query and store service telemetry and analytics data (STAD) 316 in one or more data stores. STAD 316 may include metrics about the quantity, type, definition, and consumers of cross-connect services that are configured by port provisioning engine 314. STAD 316 may include analytics information based on raw metrics data from NFU 304. For instances, analysis information of STAD 316 may include historical statistics and/or real-time statistics, which may be analyzed on various dimensions, such as consumer, service type, service use, to name only a few examples. PNP 300 may be used to configure multiple types of services other than port configuration/provisioning, in some examples.

CNC system 302 may also include financial logic 318. Financial logic 318 may store accounting information for customers. For instance, financial logic 318 may store billing information for customers, such as name, address, phone number, email, to name only a few examples. When port provisioning engine 314 configures a port for a customer, where the port includes a service charge, financial logic 318 may store such expense information. In this way, financial logic 318 may provide an accounting of port-related services purchased by a customer and provide billing for such services.

CNC system 302 may include Information Technology (IT) gateway 320 that interfaces with IT systems 322. IT systems 322 may include one or more computing devices, such as desktop computers, tablets, smartphones, and servers, to name only a few examples. IT systems 322 may provide one or more user interfaces to administrators, which may use IT systems 322 to administer CNC system 302. IT systems 322 may, for example, receive user inputs to configure CNC system 302 and/or NFU 304. Based on the user inputs, IT systems 322 may send requests and/or instructions to CNC system 302, which are received by IT gateway 320. In some examples, CNC system 302 may provide or otherwise expose one or more RESTful interfaces that can be called or otherwise invoked by IT systems 322. IT gateway 320 may route such instructions or requests to other components within CNC system 302 for further processing based on the type of requests and/or instructions.

As described above, NFU 304 may receive requests or instructions from CNC system 302 to configure and provision services for one or more ports. Network fabric provisioning engine 324 may receive the requests and/or instructions from port provisioning engine 314. Network fabric provisioning engine 324 may determine whether sufficient resources exist to satisfy a request for a port to be configured in the requisite interconnection facilities. In some examples, network fabric provisioning engine 324 may query one or more components such as SDN controllers 306, hardware configurators 308, and/or optical fabric telemetry and analytics data (NFTAD) 326. If sufficient resources exist to provision a requested port, network fabric provisioning engine 324 may send instructions and/or requests to one or more of SDN controller 306 and/or hardware configurators 308 to cause the requisite components to be configured with the port and to provision the requested service(s). As such, network fabric provisioning engine 324 provides the functionality of selecting the vendor, and form factor in which the service is delivered. Network fabric provisioning engine 324 also provides the policy manager functionality to ensure the service is delivered in the correct order of operations.

Network fabric provisioning engine 324 may query and store network switch fabric telemetry and analytics data (NFTAD) 326 in one or more data stores. NFTAD 326 may include metrics about the quantity, type, network switch fabric, and resource configurations that are configured by NFU 304. NFTAD 326 may include analytics information from infrastructure data collectors 310 based on raw metrics data for resources used in a particular service. For instances, analysis information of NFTAD 326 may include historical statistics and/or real-time statistics.

Port verification module 360 may verify a port configuration and provisioning by performing port verification operations described in this disclosure.

As shown in FIG. 5, SDN controllers 306 may configure network switch fabric resources, such as routers, switches, bridges, panels, line cards, and the like, which provide the physical infrastructure for ports of the network switch fabric for interconnection among customers within interconnection facilities. Hardware configurators 308 may configure hardware resources, such as servers or the above-mentioned network and/or network switch fabric resources; resources within servers and network resources including processor allocation, memory allocation; storage appliances; other hardware resources; and software configurations that may be configured to provision services to a customer. Infrastructure data collectors 310 may collect metrics about the quantity, type, network and resource configurations that are configured by NFU 304. For instance, infrastructure data collectors 310 may monitor and measure metrics of network switch fabric resources and any other resources configured to provision services to a customer. Infrastructure data collectors 310 may store such metrics in NFTAD 326.

Programmable network platform 300 may in some examples represent an intelligent centralized service delivery and assurance system with the ability to have fault mitigation Monitor/Analyze/Plane/Execute (MAPE) loop, that will ensure the port delivered by the system is assured to adhere the service level agreement for the life cycle of the port. Programmable network platform 300, or more specifically CNC system 302, may be the central control center for both operations and business related functions to be performed.

NFU 304 and CNC system 302 may also fulfill the need for having a distributed orchestration system for creating services and distributing the intelligence of delivering and assuring port services. Programmable network platform 300 provides the advantage of providing a distributed, horizontally scaling architecture. CNC 302 and one or more NFUs 304 may provide the functionality of delivering and assuring a business service into two distinctly separate functions, (1) CNC—may handle the function of converting the business request into service parameters, (2) NFU—may handle the function of converting the service parameters into network switch fabric parameters and instantiating the service, e.g., the requested port.

Figure 6:
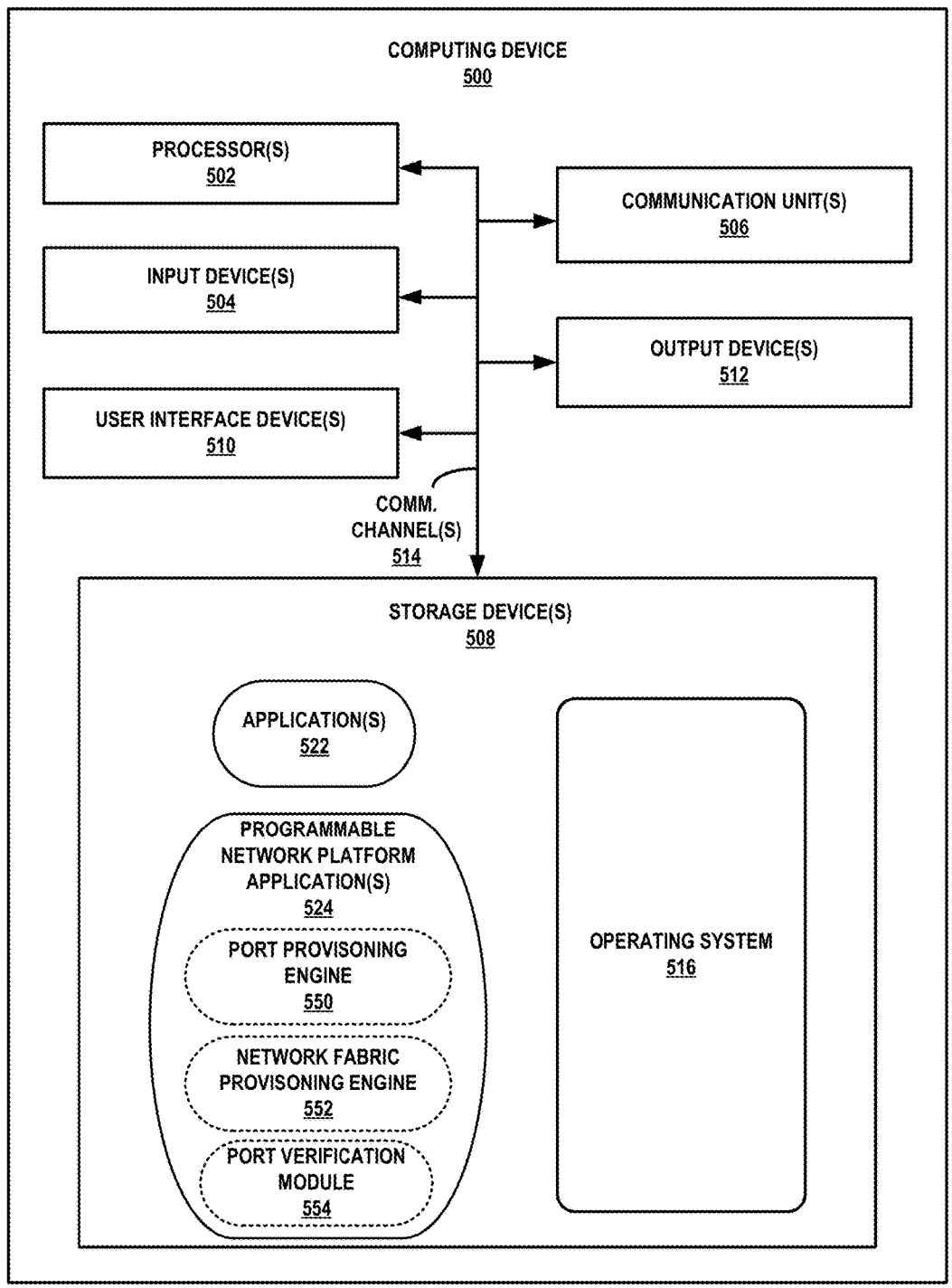
FIG. 6 is a block diagram illustrating further details of one example of a computing device that operates in accordance with one or more techniques of the present disclosure.

FIG. 6 is a block diagram illustrating further details of one example of a computing device that operates in accordance with one or more techniques of the present disclosure. FIG. 6 may illustrate a particular example of a server or other computing device 500 that includes one or more processor(s) 502 for executing any one or more of API gateway 112, orchestration engine 118, sub-systems 120, PNP 3, CNC 302, NFU 304, or any other computing device described herein. Other examples of computing device 500 may be used in other instances. Although shown in FIG. 6 as a stand-alone computing device 500 for purposes of example, a computing device may be any component or system that includes one or more processors or other suitable computing environment for executing software instructions and, for example, need not necessarily include one or more elements shown in FIG. 6 (e.g., communication units 506;

and in some examples components such as storage device(s) 508 may not be co-located or in the same chassis as other components).

As shown in the specific example of FIG. 6, computing device 500 includes one or more processors 502, one or more input devices 504, one or more communication units 506, one or more output devices 512, one or more storage devices 508, and user interface (UI) device 510, and communication unit 506. Computing device 500, in one example, further includes one or more applications 522, programmable network platform application(s) 524, and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G and WiFi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 and programmable network platform application(s) 524 with processors 502, communication unit 506, storage device 508, input device 504, user interface devices 510, and output device 512.

Application 522 and programmable network platform application(s) 524 may also include program instructions and/or data that are executable by computing device 500. Example programmable network platform application(s) 524 executable by computing device 500 may include any one or more of an orchestration engine module, API gateway module, and sub-systems; or in the illustrated architecture to include port provisioning engine 550 or network fabric provisioning engine 552, each illustrated with dashed lines to indicate that these may or may not be executable by any given example of computing device 500.

Port provisioning engine 550 may include instructions for causing computing device 500 to perform one or more of the operations and actions described in the present disclosure with respect to port provisioning engine 314. Network fabric provisioning engine 552 may include instructions for causing computing device 500 to perform one or more of the operations and actions described in the present disclosure with respect to network fabric provisioning engine 324. Port verification module 554 may include instructions for causing computing device 500 to perform one or more of the operations and actions described in the present disclosure with respect to port verification modules 360 and 902.

Figure 7:
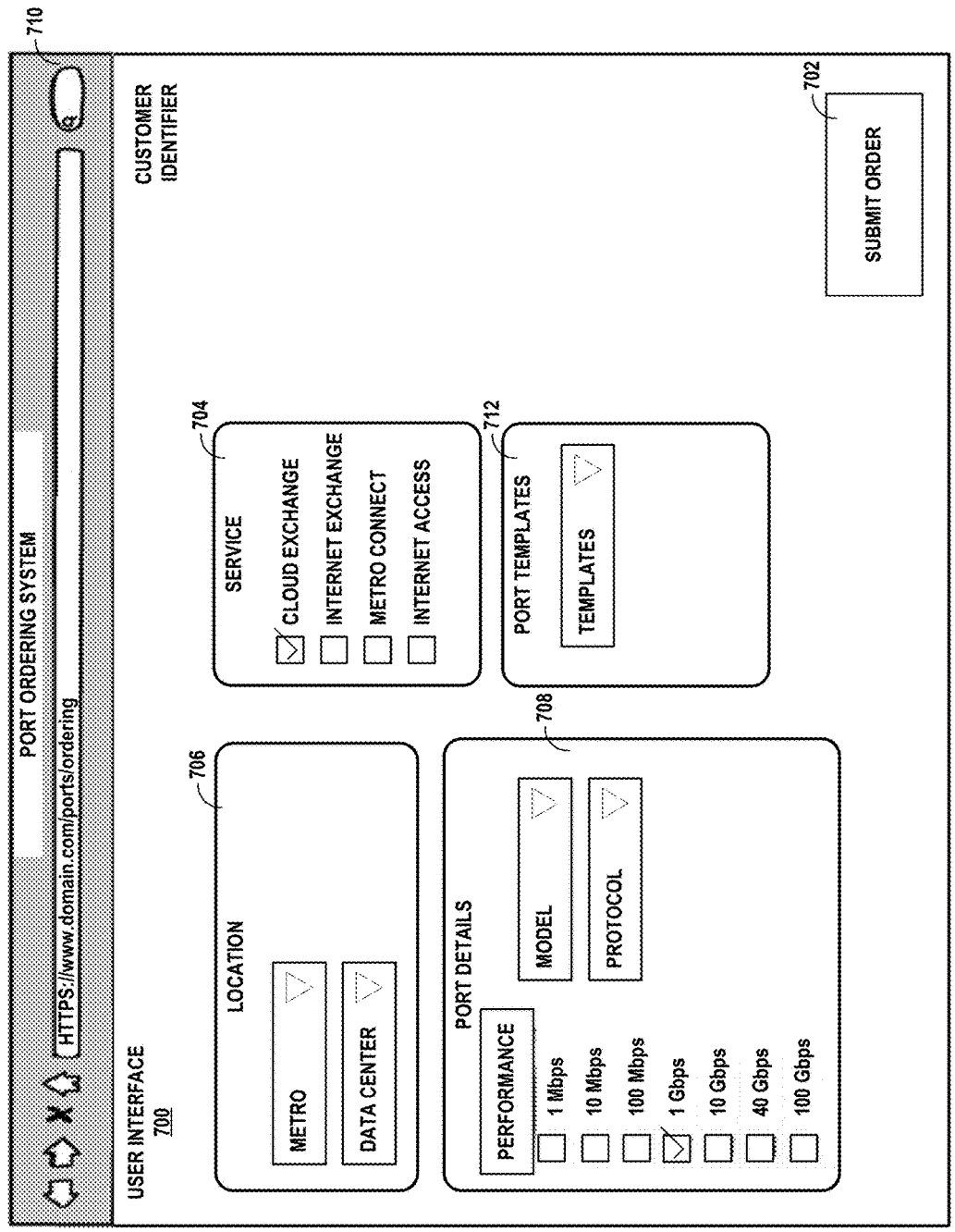
FIG. 7 is a block diagram illustrating an example port ordering user interface with which to request a port, in accordance with one or more techniques of the present disclosure.

FIG. 7 is a block diagram illustrating an example port ordering user interface 700 ("user interface 700") by which a user may request a port, in accordance with one or more techniques of the present disclosure. In some examples, a centralized network control system, such as CNC system 302, or a portal to a programmable network platform, such as application(s) 5, may generate user interface 700 for display. In some examples, user interface 700 may be implemented as one or more HTML documents that may be rendered in a web browser 710. User interface 700 may be implemented in a standalone application that is executable on a mobile computing device, desktop computing device, or laptop device to name only a few examples, and that invokes a programmable network platform in a manner described herein. For example purposes, user interface 700 is illustrated in a web browser in FIG. 7.

As shown in FIG. 7, user interface 700 may allow a user to configure a port. User interface 700 includes user interface elements for configuring a port. In some examples, user interface 700 may include a user interface element 706 that enables a user to select or otherwise specify a geographic location and/or a data center for a port. The geographic location may represent a metropolitan area ("metro") and the data center may identify a data center within the selected metro, or a data center without reference to a metro. To name only a few examples, user interface elements of interface 700 may be implemented as a drop-down menu that is pre-populated with available locations or may be implemented as a text input field in which the user may enter a location.

User interface 700 may include one or more user interface elements 708 that enable a user to select or otherwise specify characteristics of a requested port. In the example of FIG. 7, example performance requirements for the port (under "port details"), selectable by the user, include 1 Mbps, 10 Mbps, 100 Mbps, 1 Gbps, 10 Gbps, 40 Gbps, and 100 Gbps. The user may also select the form-factor or model for the requested port, as well as the Layer 1 protocol.

User interface 700 may include one or more user interface elements 704 that enable a user to select or otherwise specify a service with which the port is to be provisioned. In the example of FIG. 7, example services include a cloud exchange service, an Internet exchange service, a metro connect service, and an Internet access service. The user may select multiple services for a port.

User interface 700 may include one or more user interface elements 712 that allow a user to order a new port based on one or more templates defined for port orders. For example, port configurations for requested ports may be stored as templates that may be recalled using user interface elements 712 for additional port requests. In some examples, the user may save templates based on a selected configuration for a port for later recall for additional port requests.

User interface 700 may include a user interface element 702 to submit the selected and/or inputted values of user interface 700 for further processing. User interface element 702 is implemented as a button in FIG. 7. When user interface element 702 is selected, the selected and/or inputted values of user interface 700 may be validated and may be further processed to configure/provision the port and/or provide an estimate of cost to implement the service to the user before actually configuring/provisioning the port. In some cases, a device that outputs user interface 700 may receive the selected and/or inputted values of user interface 700 and send the values to a programmable network platform described herein for port configuration/provisioning.

In some examples, all port models, size, and other parameters are orderable from user interface 700 by any validated customer/user. The user interface 700 may enable defining all in-line parameters of the port that can be changed in flight without change to billing or reset and redo of an entire port configuration workflow. In some cases, a customer may allow others (e.g., sub-customers) to order a port on behalf of an account and have the port order approved or sent to a sub-account associated with a sub-customer. For example, the customer ordering the port may be considered a "reseller" of cloud exchange assets (e.g., a physical port or virtual port channel), and the customer may have control over asset-based permissions management using techniques described in U.S. Provisional Pat. No. 62/319,627, filed Apr. 7, 2016, entitled "ASSET-BASED PERMISSIONS MANAGEMENT FOR RESELLERS OF CLOUD EXCHANGE ASSETS," the entire contents of which are incorporated by reference herein. In some examples, the customer ordering the port may be a sub-customer of the re-seller of cloud exchange assets. In some examples the customer/user may be required to have port-ordering permissions granted by their designated customer administrator prior to being presented with user interface 700.

In some cases, user interface 700 may also allow the user to add/delete/edit network services and other services. In some examples, a centralized network control system, such as CNC system 302 may automatically send a Letter of Agreement (LOA) to the customer in response to receiving the port request via user interface 700 (e.g., within 24 hours). In some cases, user interface 700 may enable a user to specify where tie-down occurs in the corresponding customer cage, e.g., to a particular physical access point in a customer cage. For example, user interface 700 may allow the user to specify a specific cabinet in a customer cage at which the port will terminate. In some examples, this may be part of the process of a user assigning a port to a sub-customer within a customer cage.

In some examples, a customer may receive the user interface 700 via a customer portal for an interconnection facility. By interacting with user interface 700, the customer may select services and location for a requested port. The customer may enter technical information needed for port provisioning. The portal may validate data in real-time as the customer enters port information to user interface 700. The portal may pre-populate customer information to user interface 700 with information obtained from a customer database. The customer may select "live" turn up call (e.g., for testing the port is working) as part of the submitted port order. If live turn up call is not selected, the customer may self-perform a turn up validation process upon receiving a port acceptance notification to validate that the port is active once the service is delivered, as described in further detail below. In some cases, the customer may be able to select an option to duplicate a previous or existing port to reduce the amount of ordering details required to be entered.

The customer submits the port order and, in some cases, the programmable network platform sends, for display by the portal to the customer, a committed install date for the requested port. In some examples, programmable network platform determines the committed install date based on the time the request is submitted, and a standard cross-connect interval plus additional time (e.g., thirty minutes) for automated provisioning). In some cases, upon receiving a submitted port order, the portal and/or the programmable network platform determines an appropriate available port for the customer and creates a task for a provider technician to provision a cross connect from the customer to the port designated for the customer request. Upon installing the cross-connect the technician may mark the task complete. Upon determining the cross-connect install task is complete, the programmable network platform collects the logical provisioning information from the technical details submitted in the port order and the programmable network platform may send a request to SDN controllers 27 to provision one or more services for the customer. The network may use the information received from the programmable network platform to provision services for the customer.

Upon successful provisioning of service on the network, the SDN controller 27 may notify the programmable network platform, and the programmable network platform may notify the customer by sending a port acceptance notification 15 that its port is ready for acceptance. Upon receiving port acceptance notification (such as an email or SMS message) the customer may trigger port acceptance using the customer portal, which sends an indication of port acceptance to the programmable network platform. Upon successful acceptance of the port the port is considered "customer accepted." The port is therefore added to the customer's active inventory and billing is initiated.

Figure 8:
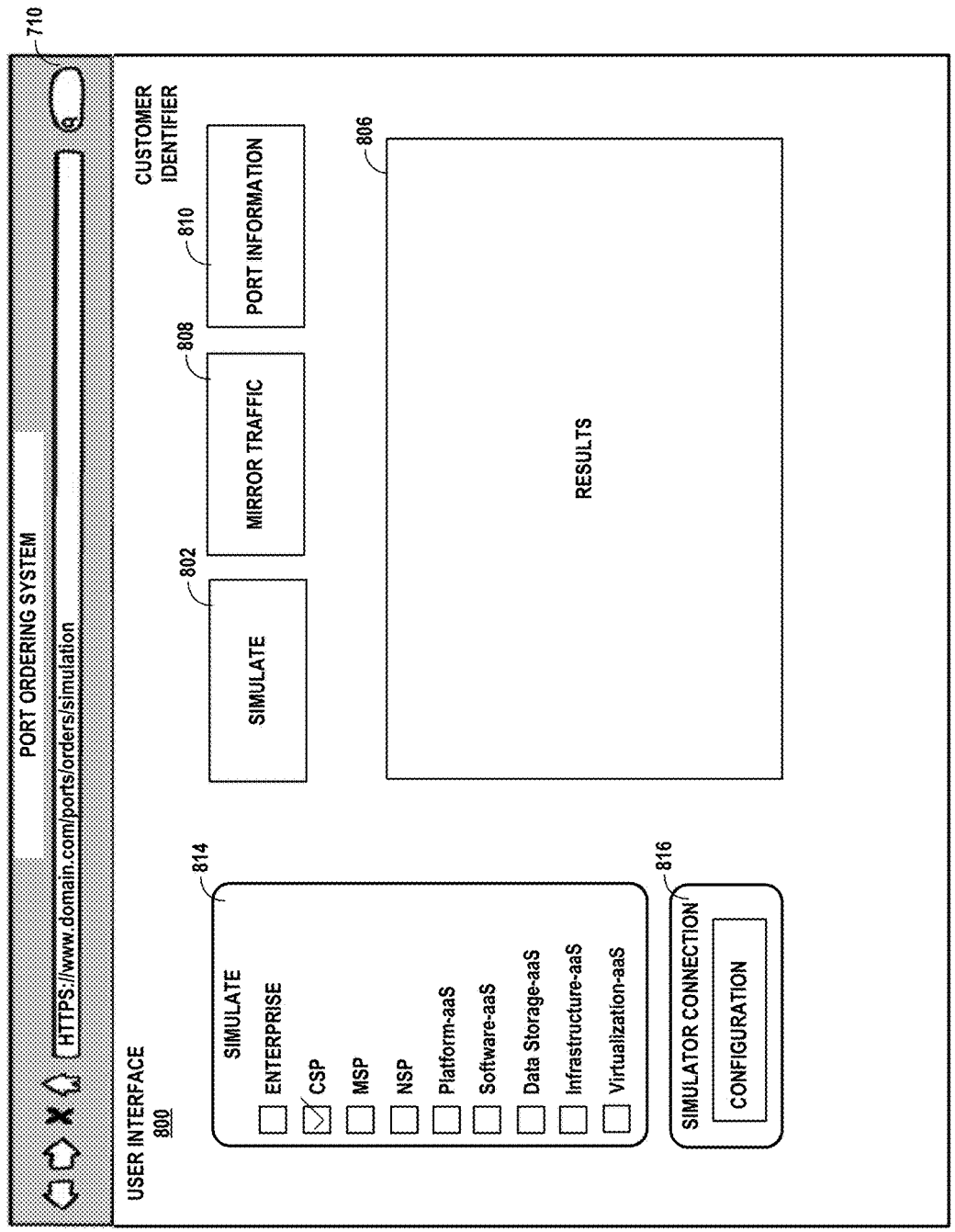
FIG. 8 is a block diagram illustrating an example port verification user interface with which to verify a port, in accordance with one or more techniques of the present disclosure.

FIG. 8 is a block diagram illustrating an example port verification user interface 800 ("user interface 800") with which to verify a port, in accordance with one or more techniques of the present disclosure. A user may use port verification user interface 800 to verify the port upon port acceptance or otherwise receiving an indication from the interconnection facility provider that the port is configured and ready to be verified. The port verification techniques described herein may enable a portal application to present functionality to a customer to perform self-service port testing. In other words, a customer may purchase a port and test, by operations of a programmable network platform of an interconnection system, the customer's port and traffic capabilities within the interconnection system (e.g., the cloud exchange) to confirm appropriate configuration and functionality. This may streamline service provisioning and reduce a need for manual testing requiring participation of interconnection system provider technicians. The port verification techniques may be combined with portal-based port ordering to create a more fully self-service startup operation for customers of the interconnection facility provider.

In some examples, a centralized network control system, such as CNC system 302, or a portal to a programmable network platform, such as application(s) 5, may generate user interface 800 for display. In some examples, user interface 800 may be implemented as one or more HTML documents that may be rendered in a web browser 710. User interface 800 may be implemented in a standalone application that is executable on a mobile computing device, desktop computing device, or laptop device, for example, and that invokes a programmable network platform in a manner described herein. For example purposes, user interface 800 is illustrated in a web browser in FIG. 8.

User interface 800 in some examples includes user interface elements 814 to request a mode of simulation for the requested port and user interface elements 816 to enable communication between a port verification application (or "port verification module" such as port verification module 902) and the customer network of the customer requesting a port via the user interface 800.

Customer simulation modes selectable using user interface elements 814 include enterprise, cloud service provider, managed service provider, network service provider, PaaS, SaaS, dSaaS, IaaS, and VaaS, in the example of FIG. 8. Other customer simulation modes for different types of customers of an interconnection system provider may be offered. A provider may offer additional or fewer customer simulation modes via user interface 800. As described in further detail below with respect to FIG. 9, when selected, a customer simulation mode may cause a port verification application to operate according to typical operations of a customer that is the customer type of the customer simulation mode. For example, the enterprise customer simulation mode may cause the port verification application to operate according to typical operations of an enterprise; the cloud service provider customer simulation mode may cause the port verification application to operate according to typical operations of a cloud service provider; and so forth. The port verification application exchanges data communications via the port being ordered to enable the customer that has ordered the port to test the port's configuration and provisioning. The port verification application may be a programmable network platform or other application deployed by the interconnection system provider.

User elements 816 include one or more data entry fields for entering configuration data with which to configure the port verification application to be able to communicate via the port with the customer network. In general, configuration data includes network configuration data for configuring interconnection interfaces, routing or other reachability information for the customer network (e.g., IP prefixes for advertisement), virtual local area network (VLAN) identifiers (e.g., for 802.1Q VLAN tagging) for an interconnection or logical interface configured for the port, a Border Gateway Protocol (BGP) Autonomous System Number (ASN) for the customer network, an customer router peer IP address (e.g., for an Autonomous System Border Router (ASBR) of the customer network), and so forth. In some cases, a device that outputs user interface 800 may receive the selected and/or inputted values of user interface 800 and send the values a port varication application. User interface 800 includes user element 806 to present results of selecting any of user interface elements 802, 808, 810. A user may select user interface element 802 to submit the selected and/or inputted values of user interface 800 for further processing. User interface element 802 is implemented as a button in FIG. 8. When user interface element 802 is selected, the selected and/or inputted values of user interface 800 including those of user elements 814, 816, may be processed to configure the simulation application. The port verification application may send indications of simulation results to the customer portal for output at user interface element 806.

A user may select user interface element 808 to request traffic mirroring by the purchased port. User interface element 808 is implemented as a button in FIG. 8. When user interface element 808 is selected, the customer portal or other application may request that the port verification application configure a network switch or other network device of the interconnection system to cause the customer port to mirror traffic to the port verification application. The port verification application may send indications of traffic mirroring, such as the traffic received at the port, packet header information for traffic received at the port, statistics of traffic received at the port, or other indications, to the customer portal for output at user interface element 806.

A user may select user interface element 810 to request port information for the purchased port. User interface element 810 is implemented as a button in FIG. 8. When user interface element 810 is selected, the customer portal or other application may request that the port verification application request port information from a network switch or other network device of the interconnection system, the port information describing the configuration and/or usage statistics for the customer port. Port information may include physical interface data such as link type and bandwidth, a MAC address, error data, traffic statistics, and the like; logical interface data such as VLAN or other encapsulation type indications, traffic statistics for the logical interface, error data, learned MAC addresses, and the like. The port verification application may request the port information from an SDN controller that controls the network switch or other network device that includes the customer port. The port verification application may send the port information to the customer portal for output at user interface element 806.

In this manner, user interface 800 may provide visualization capability to a customer to provide the customer the ability to confirm that the port is correctly provisioned and working as expected, and that the port has the expected connectivity. In some examples, user interface element 806 may display results such as a percent of dropped packets (e.g., 0% dropped), percent of bandwidth available (e.g., 100%), or generally showing information or statistics about the connectivity and functionality of the port.

Figure 9:
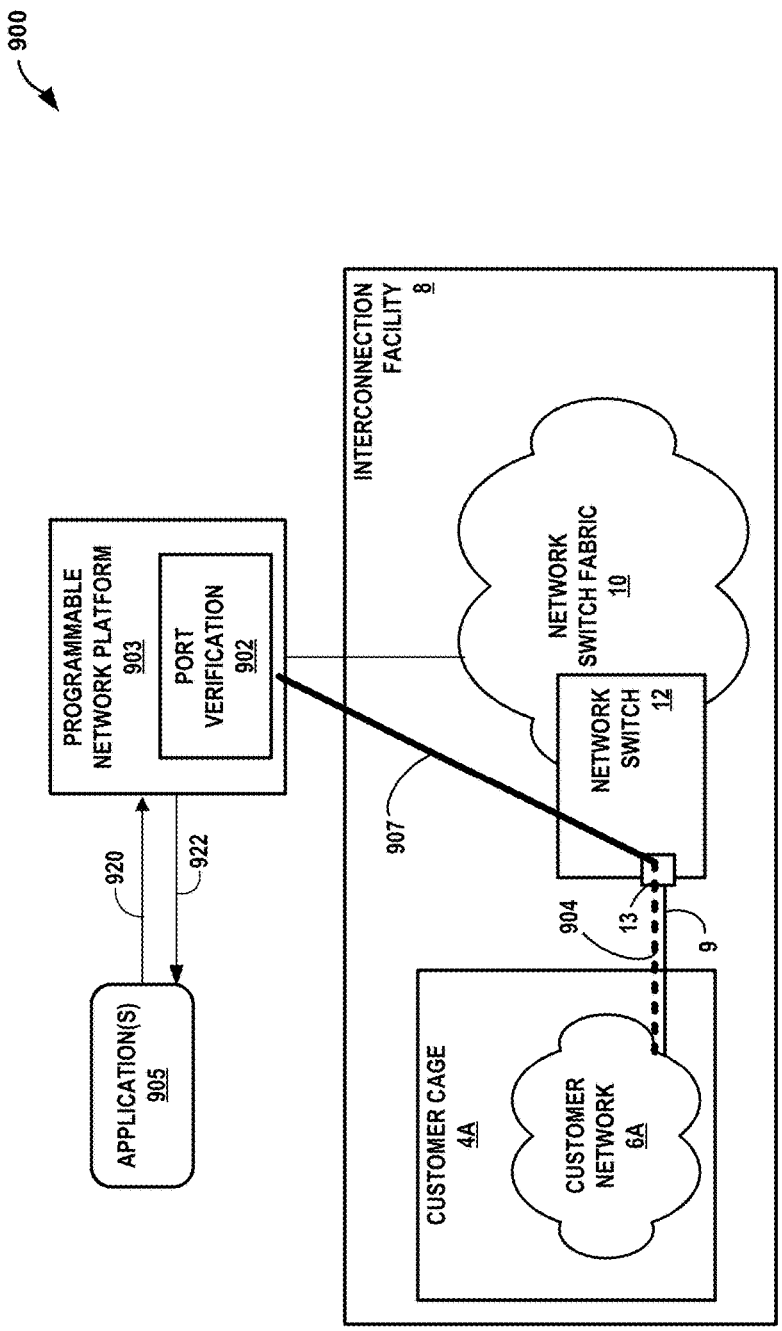
FIG. 9 is a block diagram illustrating an example interconnection system according to techniques described in this disclosure.

FIG. 9 is a block diagram illustrating an example interconnection system 900 according to techniques described in this disclosure. Application(s) 905 may include a customer portal or other interface application by which a customer may access a user interface, such as user interface 800, which invokes the programmable network platform 903 to verify a configuration and operation of customer port 13. Application(s) 905 may represent one or more example instances of application(s) 5. Application(s) 905 may output user interfaces 700, 800, e.g., for display and for receiving user input from a user.

Applications(s) 905 may represent example instances of application(s) 5, and programmable network platform 903 may represent an example instance of programmable network platform 3. Programmable network platform 903 includes port verification module 902 ("port verification 902") that is configured to perform one or more verification operations described herein to verify a configuration and operation of customer port 13 that has been purchased by a customer that has deployed customer network 6A within interconnection facility 8. In some examples, port verification 902 may represent an application or controller separate from programmable network platform 903.

The customer for customer network may configure, in customer network 6A, logical interfaces for one or more ports that connect to port 13 over cross-connect 9. The logical interfaces may include VLAN or other tunnel interface for a virtual connection between network switch 12 and customer network 6A. In the illustrated example, a VLAN 904 is configured for a customer network 6A, and programmable network platform 903 configures network switch 12 to provision VLAN 904 on port 13. The customer may further configure a routing protocol peering session to operate over VLAN 904 between a router of customer network 6A and a router reachable via VLAN 904 and port 13.

According to techniques described in this disclosure, in some examples, the customer may request, using application(s) 905, that programmable network platform 903 mirror the purchased port and provide indications of the traffic received at the port to the customer via application(s) 905. In response to receiving an indication of the request from the customer, application(s) 905 may issue a port verification request 920 (a mirroring request in this example) to programmable network platform 903. In response to port verification request 920, port verification 902 obtains an indication of the port 13 configuration. In this example, port verification 902 configures network switch 12 to mirror traffic (i.e., send copies of packets) received at port 13 to a "mirror port" configured on a switch in communication with programmable network platform 903 via communication link 907. Communication link 907 may represent a physical link and/or a virtual connection such as a VLAN. Programmable network platform 903 is coupled by one or more communication links to network switch fabric 10.

Customer network 6A may begin sending traffic to port 13 via VLAN 904, which network switch 12 mirrors to programmable network platform 903. Port verification 902 may receive the mirrored traffic from the mirror port for port 13 and output, as verification result 922, an indication of the mirrored traffic to application(s) 905, which displays the indication of the mirrored traffic to the customer. Based on the indication of the mirrored traffic, the customer that ordered port 13 may determine whether the port is correctly provisioned. For example, based on the indication of the mirrored traffic, the customer may determine the port 13 is able to transmit/receive Ethernet frames, the port 13 is correctly configured with VLAN 904 over cross-connect 9 with the customer network 6A, whether the port has visibility for or has learned MAC addresses for devices of customer network 6A, indications of configured bandwidth or port 13 performance (e.g., dropped packets), indications of a number of received and/or transmitted packets and acknowledgements, and other indications of port 13 configuration and provisioning.

In some examples, the customer may request, using application(s) 905, that programmable network platform 903 request port information from network switch 12, the port information describing the configuration and/or usage statistics for port 13 for example. In response to receiving an indication of the request from the customer, application(s) 905 may issue port verification request 920 (a port information request in this example) to programmable network platform 903. In response to port verification request 920, in such examples, port verification 902 obtains an indication of the port 13 configuration. In this example, port verification 902 may request the port information from switch 12 or from an SDN controller (not shown) that controls network switch 12. Port verification 902 may send the port information, as verification result 922, to the application(s) 905 for display to the customer. Port information may include, for example, physical interface data such as link type and bandwidth, a MAC address, error data, traffic statistics, and the like; logical interface data such as VLAN or other encapsulation type indications, traffic statistics for the logical interface, error data, learned MAC addresses, and the like.

In some examples, the customer may request, using application(s) 905, that programmable network platform 903 simulate a remote customer network reachable by customer network 6A via port 13. In response to receiving to receiving an indication of the request from the customer, application(s) 905 may issue a port verification request 920 (a customer simulation request in this example) to programmable network platform 903. In response to port verification request 920, in such examples, port verification 902 includes a simulation application that may simulate customer operations to customer network 6A via port 13. For example, port verification 902 may exchange, via port 13, data communications with customer network 6A in a manner that simulates, to customer network 6A, typical communications of remote customer network co-located in the interconnection facility 8. In some cases, port verification 902 simulates the operations of buyers (cloud customers, e.g., enterprises) or sellers (e.g., cloud services providers or resellers) of cloud services via a purchased port. For example, the communications to customer network 6A may comprise communications for a cloud service. In this way, the verification module 902 may impersonate ports or services that are programmed to behave like customers (e.g., cloud service buyers or cloud service sellers) interconnected to a customer that has requested simulated customer communications.

In some instances, port verification 902 may simulate behavior of a remote customer network router to the customer network 6A via port 13. The simulated remote customer network router may peer with the customer network 6A router for a routing protocol to receive and advertise routes for the private layer 3 network that includes the customer network 6A and the remote customer network router simulated by port verification 902. In some cases, port verification 902 may reflect or "hairpin" traffic received via port 13 to customer network 6A by, e.g., swapping source and destination addresses in the L2 and/or L3 headers of traffic received via port 13. In this way, by verifying operation of customer network 6A with the routing information received from the simulated remote customer network router, the customer may verify that establishing an interconnection to an actual remote customer network does not interfere with operation of the customer's other applications, for instance, by causing routing loops in the customer network 6A.

Figure 10:
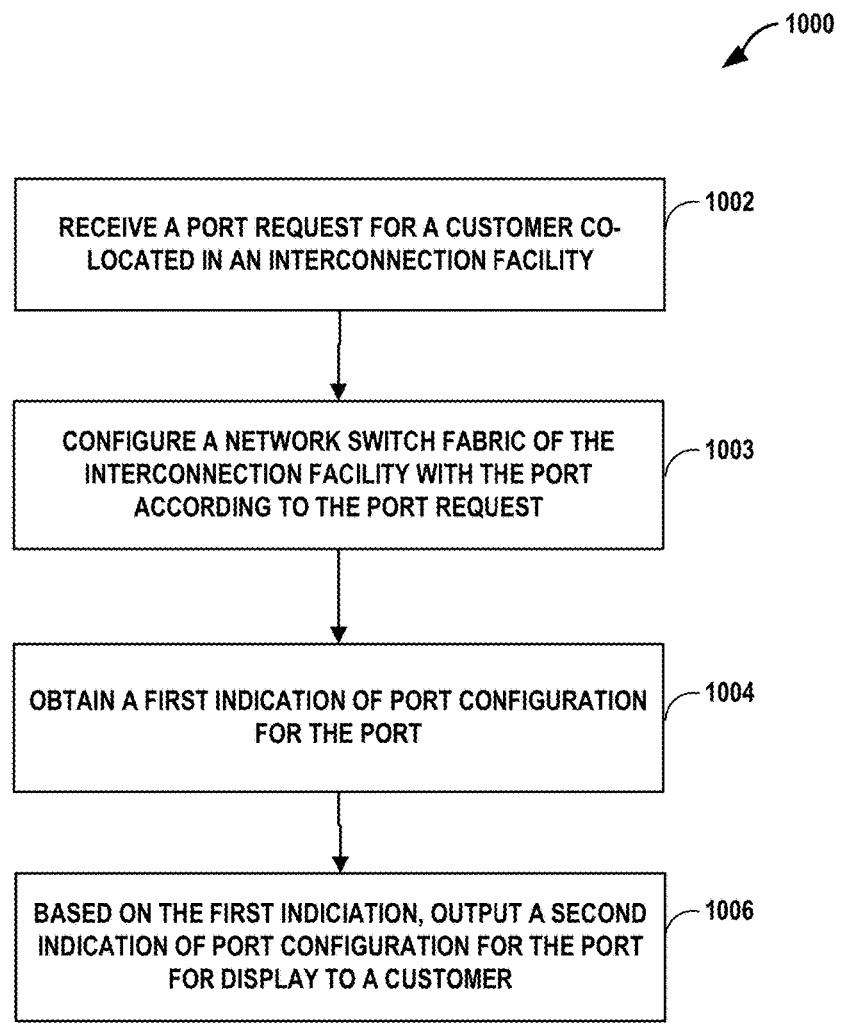
FIG. 10 is a flowchart illustrating an example mode of operation for a programmable network platform for an interconnection facility to perform port verification, according to techniques described in this disclosure.

FIG. 10 is a flowchart illustrating an example mode of operation for a programmable network platform for an interconnection facility to perform port verification, according to techniques described in this disclosure. Mode of operation 1000 is described with respect to the programmable network platform 3 but may be performed by another application executing by one or more computing devices. The programmable network platform 3 receives, via a service interface and/or from a customer portal, a port request to configure and verify a port for a customer that is co-located in an interconnection facility to enable the customer to send and receive communications via a network switch fabric of the interconnection facility (1002). The programmable network platform 3 processes the port request and, based on parameters of the port request, configures at least one network device of the network switch fabric to configure the port according to the port request (1003). Programmable network platform 3 may configure the at least one network device directly, such as by using NETCONF or other device configuration protocol, or by sending a request to configure the port to a network management system or SDN controller for the at least one network device.

Subsequently, programmable network platform 3 receives a first indication of port configuration for the port that has been configured, such as port information for the port, network traffic mirrored by the port, or a configuration success message (1004). Based on this first indication, the programmable network platform 3 generates and outputs a second indication of port configuration for the port for display to a customer (1006). The second indication may be, for instance, a message to a customer portal to cause the customer portal to display network traffic mirrored by the port, display a configuration success indication, display port configuration information, or another indication.

Figure 11:
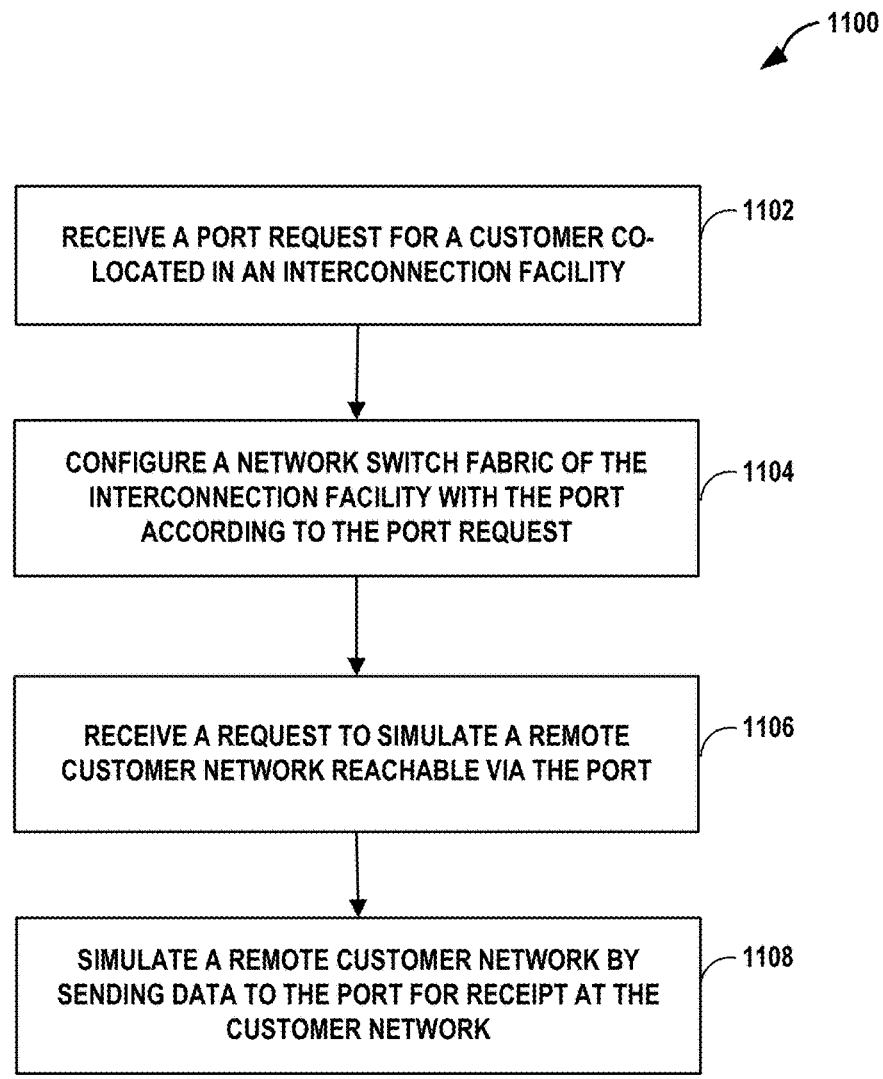
FIG. 11 is a flowchart illustrating an example mode of operation for a programmable network platform for an interconnection facility to simulate, via a port, a remote customer network, according to techniques described in this disclosure.

FIG. 11 is a flowchart illustrating an example mode of operation for a programmable network platform for an interconnection facility to simulate, via a port, a remote customer network, according to techniques described in this disclosure. Mode of operation 1100 is described with respect to the programmable network platform 3 but may be performed by another application executing by one or more computing devices.

The programmable network platform 3 receives, via a service interface and/or from a customer portal, a port request to configure and verify a port for a customer that is co-located in an interconnection facility to enable the customer to send and receive communications via a network switch fabric of the interconnection facility (1102). The programmable network platform 3 processes the port request and, based on parameters of the port request, configures at least one network device of the network switch fabric to configure the port according to the port request (1104). Programmable network platform 3 may configure the at least one network device directly, such as by using NETCONF or other device configuration protocol, or by sending a request to configure the port to a network management system or SDN controller for the at least one network device.

Programmable network platform 3 may receive, via a service interface and/or from a customer portal, a request to simulate a remote customer network that is reachable from a customer network of the customer via the port (1106). In response, the programmable network platform 3 may simulate a remote customer network by injecting data into the network switch fabric, e.g., by creating a connection to the port and sending data to the port, such that a customer network for the customer receives the data. The data may include a route according to a routing protocol, data simulating the behavior of a cloud service provider, or other data for simulation described elsewhere in this disclosure (1108).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. An interconnection system comprising:
at least one interconnection facility and a programmable network platform configured to provision a port of a plurality of ports of a network switch fabric,
the at least one interconnection facility including:
the network switch fabric having at least one network device and the plurality of ports;
a customer cage for a customer of an interconnection system provider for the interconnection system,
wherein the programmable network platform is configured to, in response to a port verification request initiated by the customer to verify the port of the plurality of ports, wherein the port is cross-connected to a customer network in the customer cage to provide connectivity with the network switch fabric:
simulate a remote customer network reachable by the customer network via the port.

2. The interconnection system of claim 1, wherein to simulate the remote customer network the programmable network platform is configured to output at least one data communication to the customer network via the port.

3. The interconnection system of claim 1, wherein to simulate the remote customer network the programmable network platform is configured to output at least one route for a routing protocol to the customer network via the port.

4. The interconnection system of claim 1,
wherein the at least one interconnection facility comprises an interconnection system provider cage accessible only to the interconnection system provider,
wherein the interconnection system provider cage includes the at least one network device.

5. The interconnection system of claim 1, further comprising:
a customer portal application configured to output an interface by which the customer initiates the port verification request,
wherein the programmable network platform comprises a service interface configured to receive, from the customer portal application, the port verification request.

6. The interconnection system of claim 1, further comprising:
a cloud-based services exchange comprising the network switch fabric,
wherein the customer is one of an enterprise and a cloud service provider coupled to the cloud-based services exchange by a cross-connect with the port.

7. A method comprising:
receiving, by a programmable network platform for at least one interconnection facility having a network switch fabric having at least one network device and a plurality of ports and a customer cage for a customer of an interconnection system provider for the at least one interconnection facility, a port request to configure and verify a port of the plurality of ports for a customer co-located in an interconnection facility, wherein the port is cross-connected to a customer network in the customer cage to provide connectivity with the network switch fabric;
by the programmable network platform in response to the port request, configuring the port in the network switch fabric; and
by the programmable network platform, in response to the port request, simulating a remote customer network reachable by the customer network via the port.

8. The method of claim 7, wherein simulating the remote customer network comprises outputting, by the programmable network platform, at least one data communication to the customer network via the port.

9. The method of claim 7, wherein simulating the remote customer network comprises outputting, by the programmable network platform, at least one route for a routing protocol to the customer network via the port.

10. The method of claim 7,
wherein the at least one interconnection facility comprises an interconnection system provider cage accessible only to the interconnection system provider,
wherein the interconnection system provider cage includes the at least one network device.

11. The method of claim 7, further comprising:
outputting, by a customer portal application, an interface by which the customer initiates the port request;
receiving, by the customer portal application, parameters for the port request;
generating, by the customer portal application based at least on the parameters for the port request, the port request; and
receiving, by a service interface of the programmable network platform and from the customer portal application, the port request.

* * * * *